United States Patent
Hua et al.

(10) Patent No.: US 8,654,255 B2
(45) Date of Patent: Feb. 18, 2014

(54) ADVERTISEMENT INSERTION POINTS DETECTION FOR ONLINE VIDEO ADVERTISING

(75) Inventors: Xian-Sheng Hua, Beijing (CN); Tao Mei, Beijing (CN); Linjun Yang, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1275 days.

(21) Appl. No.: 11/858,628

(22) Filed: Sep. 20, 2007

(65) Prior Publication Data

US 2009/0079871 A1    Mar. 26, 2009

(51) Int. Cl.
*H04N 9/74*    (2006.01)

(52) U.S. Cl.
USPC .......................... 348/584; 348/382; 348/701

(58) Field of Classification Search
USPC ........................... 348/584, 701, 382
See application file for complete search history.

(56) References Cited

U.S. PATENT DOCUMENTS

| | | | |
|---|---|---|---|
| 5,255,098 A | 10/1993 | Poivet et al. | |
| 5,600,366 A | 2/1997 | Schulman | |
| 5,671,253 A | 9/1997 | Stewart | |
| 5,915,250 A * | 6/1999 | Jain et al. | 1/1 |
| 6,072,542 A | 6/2000 | Wilcox et al. | |
| 6,425,127 B1 | 7/2002 | Bates et al. | |
| 6,519,283 B1 | 2/2003 | Cheney et al. | |
| 6,698,020 B1 | 2/2004 | Zigmond et al. | |
| 6,718,551 B1 | 4/2004 | Swix et al. | |
| 6,950,623 B2 | 9/2005 | Brown et al. | |
| 7,064,857 B2 | 6/2006 | Parker et al. | |
| 7,206,854 B2 | 4/2007 | Kauffman et al. | |
| 7,209,882 B1 | 4/2007 | Cosatto et al. | |
| 7,246,314 B2 | 7/2007 | Foote et al. | |
| 7,296,231 B2 | 11/2007 | Loui et al. | |
| 7,428,345 B2 | 9/2008 | Caspi et al. | |
| 7,451,099 B2 | 11/2008 | Henkin et al. | |
| 7,707,605 B2 | 4/2010 | Yamada et al. | |
| 2001/0034646 A1 | 10/2001 | Hoyt et al. | |
| 2002/0059591 A1 | 5/2002 | Nakagawa | |
| 2002/0100042 A1 | 7/2002 | Khoo et al. | |

(Continued)

FOREIGN PATENT DOCUMENTS

| | | |
|---|---|---|
| JP | 2006106404 | 4/2006 |
| KR | 20060073578 | 6/2006 |

(Continued)

OTHER PUBLICATIONS

Conheady, "PhotoShop Tutorial: Using Adjustment Layers and Masking", Retrieved on Feb. 25, 2011 at <<http://nyfalls.com/article-photoshop-adjustment-layers.html>>, copyright 2006 Matthew Conheady (v1.0), 5 pgs.

(Continued)

*Primary Examiner* — Jivka Rabovianski
(74) *Attorney, Agent, or Firm* — Lee & Hayes, PLLC

(57) ABSTRACT

Systems and methods for determining insertion points in a first video stream are described. The insertions points being configured for inserting at least one second video into the first video. In accordance with one embodiment, a method for determining the insertion points includes parsing the first video into a plurality of shots. The plurality of shots includes one or more shot boundaries. The method then determines one or more insertion points by balancing a discontinuity metric and an attractiveness metric of each shot boundary.

25 Claims, 8 Drawing Sheets

(56) References Cited

U.S. PATENT DOCUMENTS

| | | |
|---|---|---|
| 2002/0103698 A1 | 8/2002 | Cantrell |
| 2002/0113815 A1 | 8/2002 | DeGross |
| 2002/0124251 A1 | 9/2002 | Hunter et al. |
| 2002/0147637 A1 | 10/2002 | Kraft et al. |
| 2002/0178447 A1 | 11/2002 | Plotnick et al. |
| 2003/0187737 A1 | 10/2003 | Naito |
| 2003/0188308 A1* | 10/2003 | Kizuka ............................ 725/32 |
| 2003/0191688 A1 | 10/2003 | Prince, III et al. |
| 2004/0034874 A1 | 2/2004 | Hord et al. |
| 2004/0045028 A1 | 3/2004 | Harris |
| 2004/0073947 A1 | 4/2004 | Gupta |
| 2004/0078188 A1 | 4/2004 | Gibbon et al. |
| 2004/0093327 A1 | 5/2004 | Anderson et al. |
| 2004/0117827 A1 | 6/2004 | Karaoguz et al. |
| 2004/0148221 A1 | 7/2004 | Chu |
| 2004/0161154 A1* | 8/2004 | Hua et al. ...................... 382/229 |
| 2004/0194130 A1 | 9/2004 | Konig et al. |
| 2004/0204985 A1 | 10/2004 | Gibson et al. |
| 2004/0221304 A1 | 11/2004 | Sparrell et al. |
| 2005/0018216 A1 | 1/2005 | Barsness et al. |
| 2005/0076357 A1 | 4/2005 | Fenne |
| 2005/0114198 A1 | 5/2005 | Koningstein et al. |
| 2005/0114526 A1 | 5/2005 | Aoyama |
| 2005/0116965 A1 | 6/2005 | Grunder |
| 2005/0123886 A1* | 6/2005 | Hua et al. ................... 434/307 A |
| 2005/0137958 A1* | 6/2005 | Huber et al. ..................... 705/37 |
| 2005/0166224 A1 | 7/2005 | Ficco |
| 2005/0172234 A1 | 8/2005 | Chuchla |
| 2005/0240580 A1 | 10/2005 | Zamir et al. |
| 2005/0264703 A1* | 12/2005 | Aoki ............................. 348/701 |
| 2005/0283793 A1 | 12/2005 | Chiu |
| 2006/0020961 A1 | 1/2006 | Chiu |
| 2006/0026013 A1 | 2/2006 | Kraft |
| 2006/0026628 A1 | 2/2006 | Wan et al. |
| 2006/0100928 A1 | 5/2006 | Walczak, Jr. et al. |
| 2006/0111979 A1 | 5/2006 | Chu |
| 2006/0128469 A1 | 6/2006 | Willis et al. |
| 2006/0179453 A1 | 8/2006 | Kadie et al. |
| 2006/0212350 A1 | 9/2006 | Ellis et al. |
| 2006/0247037 A1 | 11/2006 | Park |
| 2007/0019261 A1 | 1/2007 | Chu |
| 2007/0050253 A1 | 3/2007 | Biggs et al. |
| 2007/0055983 A1 | 3/2007 | Schiller et al. |
| 2007/0055985 A1 | 3/2007 | Schiller et al. |
| 2007/0061204 A1 | 3/2007 | Ellis et al. |
| 2007/0067493 A1 | 3/2007 | Issa |
| 2007/0130015 A1 | 6/2007 | Starr et al. |
| 2007/0157228 A1 | 7/2007 | Bayer et al. |
| 2007/0198285 A1 | 8/2007 | Mottla et al. |
| 2007/0198506 A1 | 8/2007 | Attaran Rezaei et al. |
| 2007/0204310 A1 | 8/2007 | Hua et al. |
| 2007/0226062 A1 | 9/2007 | Hughes et al. |
| 2007/0300152 A1 | 12/2007 | Baugher |
| 2008/0082405 A1 | 4/2008 | Martinez et al. |
| 2008/0112684 A1 | 5/2008 | Matsushita et al. |
| 2008/0250449 A1 | 10/2008 | Torkos |
| 2009/0076882 A1 | 3/2009 | Mei et al. |
| 2009/0079871 A1 | 3/2009 | Hua et al. |
| 2009/0099900 A1 | 4/2009 | Boyd et al. |
| 2011/0125578 A1* | 5/2011 | Alspector et al. .......... 705/14.53 |

FOREIGN PATENT DOCUMENTS

| | | |
|---|---|---|
| KR | 20060112841 | 11/2006 |
| WO | WO0133752 A1 | 5/2001 |
| WO | WO0180039 A2 | 10/2001 |
| WO | WO2005086081 A1 | 9/2005 |
| WO | WO2005086969 A2 | 9/2005 |

OTHER PUBLICATIONS

Elkin, "Microsoft's MSN Fattens Banners With Rich Media; Click-through Rates Double for Unilever's Dove in Ad Test", Crain Communications, Advertising Age, vol. 71, Sep. 2000, p. 52.

Lyons, et al., "Multimodal Interactive Advertising", In the Proceedings of the Workshop on Perceptual User Interfaces (PUI'98), Nov. 1998, 4 pgs.

Neatware.com, "Digital Signage", Retrieved on Feb. 25, 2011 at <<http://web.archive.org/web/20070827183554/http://www.neatware.com/player/app_signage.html>>, 7 pgs.

Walker, et al., "The Impact of Comparative Advertising on Perception Formation in New Product Introductions", Association for Consumer Research, Advances in Consumer Research, vol. 13, 1986, 8 pgs.

Yan, "Basic PhotoShop Skill: Editing the Background", Retrieved on Feb. 1, 2011 at <<http://www.fubargenre.com/2007/04/01/basic-photoshop-skill-editing-the-background/>>, Apr. 1, 2007, 13 pgs.

Hua et al., "Microsoft Research Asia TRECVID 2006: High-Level Feature Extraction and Rushes Exploitation", NIST TRECVID Workshop, Nov. 2006, 9 pgs.

Hua et al., "Optimization-Based Automated Home Video Editing System", IEEE Transactions on Circuits and Systems for Video Technology, May 2004, vol. 14, Issue 5, 25 pgs.

Hua et al, "Personal Media Sharing and Authoring on the Web", Proceedings 13th Annual ACM Intl Conf on Multimedia, Nov. 2005, 4 pgs.

Lu et al., "Content-Based Audio Classification and Segmentation by Using Support Vector Machines", Multimedia Systems, vol. 8, No. 6, Apr. 2003, pp. 482-491.

Ma et al., "A Generic Framework of User Attention Model and Its Application in Video Summarization", IEEE Transactions on Multimedia, Oct. 2005, vol. 7, Issue 5, pp. 907-919.

Ma et al., "A User Attention Model for Video Summarization", Proceedings 10th ACM Intl Conf on Multimedia, Dec. 2002, 10 pgs.

Platt, "AutoAlbum: Clustering Digital Photographs Using Probabilistic Model Merging", IEEE Workshop on Content-Based Access of Images and Video Libraries, 2000, 6 pgs.

Qi et al., "Video Annotation by Active Learning and Cluster Tuning", 2006 Conf on Computer Vision and Pattern Recognition Workshop, Jun. 2006, 8 pgs.

Song et al., "An Automatic Video Semantic Annotation Scheme Based on Combination of Complementary Predictors", IEEE Intl Conf on Acoustics, Speech and Signal Processing, May 2006, 4 pgs.

Song et al., "Efficient Semantic Annotation Method for Indexing Large Personal Video Database", Proceedings 8th ACM Intl workshop on Multimedia Information Retrieval, Oct. 2006, pp. 289-296.

Song et al., "Semi-Automatic Video Annotation Based on Active Learning with Multiple Complementary Predictors", Proceedings 7th ACM SIGMM Intl Workshop on Multimedia Information Retrieval, Nov. 2005, pp. 97-103.

Song et al., "Semi-Automatic Video Semantic Annotation Based on Active Learning", Intl Conf on Visual Communications and Image Processing, Jul. 2005, 8 pgs.

Song et al., "Video Annotation by Active Learning and Semi-Supervised Ensembling", 2006 IEEE Intl Conf on Multimedia and Expo, Jul. 2006, pp. 933-936.

Tang et al., "To Construct Optimal Training Set for Video Annotation", Proceedings 14th Annual ACM Intl Conf on Multimedia, Oct. 2006, pp. 89-92.

Wang et al., "Automatic Video Annotation by Semi-Supervised Learning with Kernel Density Estimation", Proceedings 14th Annual ACM Intl Conf on Multimedia, Oct. 2006, pp. 967-976.

Wang et al., "Automatic Video Annotation Based on Co-Adaptation and Label Correction", Proceedings 2006 IEEE Intl Symposium on Circuits and Systems, May 2006, pp. 5507-5510.

Wang et al., "Enhanced Semi-Supervised Learning for Automatic Video Annotation", 2006 IEEE Intl Conf on Multimedia and Expo, Jul. 2006, pp. 1485-1488.

Wang et al., "Semi-Supervised Kernel Regression", 6th IEEE Intl Conf on Data Mining, 2006, 6 pgs.

Yuan et al., "Automatic Video Genre Categorization Using Hierarchical SVM", 2006 IEEE Intl Conf on Image Processing, Oct. 2006, 4 pgs.

Yuan et al., "Manifold-Ranking Based Video Concept Detection on Large Database and Feature Pool", Proceedings 14th Annual ACM Intl Conf on Multimedia, Oct. 2006, pp. 623-626.

(56) References Cited

OTHER PUBLICATIONS

Zhang et al., "A New Shot Boundary Detection Algorithm", IEEE Pacific Rim Conf on Multimedia, 2001, 7 pgs.
Zhang et al., "Automatic Partitioning of Full-Motion Video", Multimedia Systems, vol. 1, No. 1, 1993, 19 pgs.
Zhao et al., "Video Shot Grouping Using Best-First Model Merging", Storage and Retrieval for Media Databases, 2001, 8 pgs.
The Beatroot, "Polish Plumber Gets The Sack", Available at <<http://beatroot.blogspot.com/2006/01/polish-plumber-gets-sack.html>>, Jan. 20, 2006, pp. 1-3.
Warhol Workboots, Tagllalatella Galleries, Retrieved on Oct. 15, 2010, <<http://www.bing.com/images/search?q=advertising+pictures+and+(positive+to+negative+(image+or+picture))&FORM=IGRE&qpvt=advertising+pictures+and+(positive+to+negative+(image+or+picture))#focal=f5ecc98fd70f615c3bf447ce5b13abf1&furl=http%3A%2F%2Fwww.djtfineart.com%2Fimages%2Fartwork%2Full%2FWarhol006.jpg—Warhol Workboots>>, 1 pg.
U.S. Appl. No. 11/767,410, filed Jun. 22, 2007, Hua et al, Image Advertising System, 43 pgs.
"AdBrite", retrieved on Apr. 26, 2007, at <<http://www.adbrite.com/mb/about_video.php>>, 1 pg.
"AdSense and Video Sites: A New Way to Make Money", retrieved on Nov. 5, 2007 at <<http://incomeblogs.blogspot.com/2006/12/adsense-and-video-sites-new-way-to.html>>, Dec. 3, 2006, 4 pgs.
"Blinkx", retrived on Nov. 18, 2008 at <<www.blinkx.com\wall>>.
"BritePic", retrieved on Apr. 26, 2007, at <<http://www.britepic.com/learnmore.php>>, Adbrite, 2007, pp. 1-2.
"Contextual In-Video Advertising: ScanScout", retrieved on 44/5/2007 at <<http://www.techcrunch.com/2007/05/14/contextual-in-video-advertising-scanscout/>>, May 14, 2007, 4 pgs.
Deng et al, "Unsupervised Segmentation of Color-Texture Regions in Images and Video," IEEE Transactions on Pattern Analysis and Machine Intelligence, vol. 23, No. 8, Aug. 2001, 27 pgs.
"Google AdWords Editorial Guidelines for Image Ads", retrieved on Apr. 26, 2007, at <<https://adwords.google.com/select/imageguidelines.html>>, Google AdWords, 2006, pp. 1-9.
Hristova, et al., "Ad-me: Wireless Advertising Adapted to the User Location, Device and Emotions", Proceedings of the 37th Hawaii International Conference on System Sciences, IEEE, 2004, 10 pgs.
IBM E-Business Solutions, "Hitplay Media Streams Video into Dollars with WebSphere Application Server", Available at http://abf-dss.com/pdf/HitPlay1.pdf, 2000, 4 pgs.
Irani et al., "Mosaic Based Representations of Video Sequences and Their Applications", retrived on Nov. 18, 2008, <<http://ieeexplore.ieee.org/stamp/stamp.jsp?arnumber+466883&isnumber=9796>>, pp. 605-pp. 611.
Irani et al., "Video Indexing Based on Mosaic Representations", 1998 IEEE, vol. 86, No. 5, May 1998, 17 pgs.
Jia, et al, "Video Completion using Tracking and Fragment Merging", retrieved on Nov. 18, 2008, at <<http://ralph.cs.cf.ac.uk/papers/Geometry/videocompletion.pdf>>pp. 1-pp. 9.
Kang et al., "Correlated Label Propagation with Application to Multi-Label Learning", 2006 IEEE Computer Society Conf on Computer Vision and Pattern Recognition, 8 pgs.
Kang et al, "Space-Time Video Montage", retrived on Nov. 18, 2008, <<https://www.hwkang.com/files/CVPR06VideoMontage.pfd>>, Microsoft Research, Mar. 2006, CVPR (2), 8 pgs.
Levin et al, "A Closed Form Solution to Natural Image Matting," In Proceedings of IEEE Computer Vision and Pattern Recognition, 2006, 10 pgs.
Liu et al., "Video Collage," In Proceedings of ACM International Conference on Multimedia, ACM, MM'07, Augsburg, Germany, Sep. 23-28, 2007, pp. 461-462.
Ma et al, "User Attention Model based Video Summarization," IEEE Transactions on Multimedia Journal, 2005, 13 pgs.
Magnor et al, "Spacetime-coherent Geometry Reconstruction from Multiple Video Streams", retrieved on Nov. 18, 2008, <<http://graphics.tu-bs.de/people/magnor/publications/3dpvt04.pdf>>, Proceedings 2nd Intl Symposium on 3D Data Processing, Visualization and Transmission, Sep. 2004, 3DPVT, 8 pgs.
Mei et al., "MSRA-USTC-SJTU at Trecvid 2007: High Level Feature Extraction and Search", TREC Video Retrieval Evaluation Online Proceedings, 2007, 12 pgs.
Mei et al., "VideoSense—Towards Effective Online Video Advertising", Proceedings 15th Intl conf on Multimedia, ACM, Sep. 2007, 10 pgs.
Mei, et al., "Videosense: A Contextual Video Advertising System", at <<ttp://delivery.acm.org/10.1145/1300000/1291342/p463-mei.pdf?key1=1291342&key2=2633334911&coll=GUIDE&dl=&CFID=41780570&CFTOKEN=13059784>>, ACM, MM'07, Augsburg, Bavaria, Germany, Sep. 23-28, 2007, pp. 463-464.
Mei, et al., "Videosense: Towards Effective Online Video Advertising", at <<http://research.microsoft.com/%7Exshua/publications/pdf/2007_ACMMM_VideoSense.pdf >>, ACM, MM'07, Augsburg, Bavaria, Germany, Sep. 23-28, 2007, 10 pgs.
Ney et al., "Data Driven Search Organization for Continuous Speech Recognition", IEEE Transactions on Signal Processing, vol. 40, No. 2, Feb. 1992, 10 pgs.
Perez et al, "Poisson Image Editing," ACM Transactions on Graph, 2003, pp. 313-318.
Rabiner, "A Tutorial on Hidden Markov Models and Selected Applications in Speech Recognition" Proceedings IEEE, vol. 77, No. 2, Feb. 1989, 30 pgs.
Rav-Acha et al., "Making a Long Video Short: Dynamic Video Synopsis", Proceedings 2006 IEEE Computer Society Conf on Computer Vision and Pattern Recognition, 2006, 7 pg.
Rother et al., "AutoCollage", Proceedings ACM SIGGRAGPH, 2006, 6 pgs.
Shi et al, "Normalized Cuts and Image Segmentation," IEEE Transactions on Pattern Analysis and Machine Intellience, vol. 22, No. 8, Aug. 2000, pp. 888-905.
Smith et al., "Video Skimming and Characterization Through the Combination of Image and Language Understanding", IEEE 1998 Intl Workshop on Content-Based Access of Image and Video Databases, Jan. 3, 1998, 10 pgs.
Subrahmanian, et al, "The CPR Model for Summarizing Video", retrieved on Nov. 18, 2008,<<http://delivery.acm.org/10.1145/960000/951679/p2-fayzullin.pdf?key1=951679&key2=4658707221&coll=GUIDE&dl=GUIDE&CFID=11563131&CFTOKEN=25393126>>, pp. 2-9.
Wang et al., "Video Collage: A Novel Presentation of Video Sequence", 2007 IEEE Intl Conf on Multimedia and Expo, Jul. 2007, 4 pgs.
Weeks, "Web-Based Video Advertising Is Red Hot", Available at http://www.imediaconnection.com/content/3544.asp, May 27, 2004, 4 pgs.
Winn et al., "Object Categorization by Learned Universal Visual Dictionary", Proceedings 10th IEEE Intl Conf on Computer Vision, vol. 2, 2005, 8 pgs.
www.VibrantMedia.com, available at lease as early as Nov. 1, 2007, 4 pgs.
Yeung et al., "Video Visualization for Compact Presentation and Fast Browsing of Pictorial Content", IEEE Transactions on Circuits and Systems for Video Technology, vol. 7, No. 5, Oct. 1997, 15 pgs.
Hjelsvold, et al., "Web-based Personalization and Management of Interactive Video", found at <<http://delivery.acm.org/10.1145/380000/371969/p129-hjelsvold.pdf?key1=371969&key2=7668361811&coll=GUIDE&dl=GUIDE&CFID=25387987&CFTOKEN=45755316>>, Proceedings of 10th Intl Conf on World Wide Web, 2001, pp. 129-139.
Wan, et al., "Advertising Insertion in Sports Webcasts", found at <<http://info.computer.org/portal/cms_docs_multimedia/multimedia/content/Promo/u2078_2007.pdf>>, IEEE, 2007, pp. 78-82.
Office Action for U.S. Appl. No. 11/767,410, mailed on Mar. 1, 2012, Xian-Sheng Hua, "Image Advertising System", 20 pgs.
Non-Final Office Action for U.S. Appl. No. 11/626,251, mailed on Mar. 15, 2012, Xian-Sheng Hua et al., "Automatically Inserting Advertisements into Source Video Content Playback Streams", 13 pages.

(56) References Cited

OTHER PUBLICATIONS

Final Office Action for U.S. Appl. No. 12/143,696, mailed on May 3, 2011, Tao Mei et al., "Impressionative Multimedia Advertising", 29 pgs.
Office action for U.S. Appl. No. 12/143,696, mailed on Oct. 15, 2012, Mei et al., "Impressionative Multimedia Advertising", 28 pages.
Office action for U.S. Appl. No. 11/767,410, mailed on Oct. 24, 2012, Hua et al., "Image Advertising System", 26 pages.
Office action for U.S. Appl. No. 11/626,251, mailed on Nov. 20, 2012, Hua et al., "Automatically Inserting Advertisements into Source Video Content Playback Streams", 14 pages.
Office Action for U.S. Appl. No. 12/143,696, mailed on Aug. 19, 2011, Tao Mei, "Impressionative Multimedia Advertising", 30 pgs.
Office Action for U.S. Appl. No. 12/143,696, mailed on Dec. 6, 2011, Tao Mei, "Impressionative Multimedia Advertising", 23 pgs.
Non-Final Office Action for U.S. Appl. No. 12/334,231, mailed on Sep. 16, 2011, Tao Mei, "Multi-Video Synthesis", 21 pages.
Grundland et al., "Cross Dissolve Without Cross Fade: Preserving Contrast, Color and Salience in Image Compositing", Eurographics, vol. 25, No. 3, 2006, 10 pages.
Office action for U.S. Appl. No. 12/143,696, mailed on Mar. 14, 2013, Mei et al., "Impressionative Multimedia Advertising", 32 pages.

* cited by examiner

300

| | Less-Intrusive | More-Intrusive |
|---|---|---|
| Less-attractive | $-\alpha A - \beta D$ | $-\alpha A + \beta D$ |
| More-attractive | $\alpha A - \beta D$ | $\alpha A + \beta D$ |

302 — Less-Intrusive
304 — More-Intrusive
306
308

402 — Parse A Video Source Into Shots

404 — Compute A Degree of Discontinuity For Each Shot Boundary

406 — Compute A Degree of Attractiveness For Each Shot Boundary

408 — Determine One or More Insertion Points Based On The Discontinuity and Attractiveness Of Each Shot Boundary 410 — Insert At Least One Video Advertisement At Each Of The One or More Insertion Points

FIGURE 4

ADVERTISEMENT INSERTION POINTS DETECTION FOR ONLINE VIDEO ADVERTISING

BACKGROUND

Video advertisements typically have a greater impact on viewers than traditional online text-based advertisements. Internet users frequently stream online source video for viewing. A search engine may have indexed such a source video. The source video may be a video stream from a live camera, a movie, or any videos accessed over a network. If a source video includes a video advertisement clip (a short video, an animation such as a Flash or GIF, still images, etc.), a human being has typically manually inserted the video advertisement clip into the source video. Manually inserting advertisement video clips into source video is a time-consuming and labor-intensive process that does not take into account the real-time nature of interactive user browsing and playback of online source video.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for determining of insertion points for a first video stream. In one embodiment, a method for determining the video advertisement insertion points includes parsing a first video into a plurality of shots. The plurality of shots includes one or more shot boundaries. The method then determines one or more insertion points by balancing the discontinuity and attractiveness for each of the one or more shot boundaries. The insertions points are configured for inserting at least one second video into the first video.

In a particular embodiment, the determination of the insertion points includes computing a degree of discontinuity for each of the one or more shot boundaries. Likewise, the determination of the insertion points also includes computing a degree of attractiveness for each of the one or more shot boundaries. The insertion points are then determined based on the degree of discontinuity and the degree of attractiveness of each shot boundary. Once the insertion points are determined, at least one second video is inserted at each of the determined insert points so that an integrated video stream is formed. In a further embodiment, the integrated video stream is provided to a viewer for playback. In turn, the viewer may assess the effectiveness of the insertion points based on viewer feedback to a played integrated video stream.

In another embodiment, a computer readable medium for determining insertion points for a first video stream includes computer-executable instructions. The computer executable instructions, when executed, perform acts that comprise parsing the first video into a plurality of shots. The plurality of shots includes one or more shot boundaries. A degree of discontinuity for each of the one or more shot boundaries is then computed. Likewise, a degree of attractiveness for each of the one or more shot boundaries is also computed. The insertion points are then determined based on the degree of discontinuity and the degree of attractiveness of each shot boundary. The insertions points being configured for inserting at least one second video into the first video.

Once the insertion points are determined, at least one second video is inserted at each of the determined insert points so that an integrated video stream is formed.

In an additional embodiment, a system for determining insertion points for a first video stream comprises one or more processors. The system also comprises memory allocated for storing a plurality of computer-executable instructions that are executable by the one or more processors. The computer-executable instructions comprise instructions for parsing the first video into a plurality of shots, the plurality of shots includes one or more shot boundaries, computing a degree of discontinuity for each of the one or more shot boundaries, computing a degree of attractiveness for each of the one or more shot boundaries. The instructions also enable the determination of the one or more insertion points based on the degree of discontinuity and the degree of attractiveness of each shot boundary. The insertions points being configured for inserting at least one second video into the first video. Finally, the instructions further facilitate the insertion of the at least one second video at each of the determined insert points to form an integrated video stream.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 3 is a diagram that illustrates exemplary schemes for the determination of video advertisement insertion points.

FIG. 4 depicts an exemplary flow diagram for determining video advertisement insertion points using the representative computing environment shown in FIG. 12.

DETAILED DESCRIPTION

This disclosure is directed to systems and methods that facilitate the insertion of video advertisements into source videos. A typical video advertisement, or advertising clip, is a short video that includes text, image, or animation. Video advertisements may be inserted into a source video stream so that as a viewer watches the source video, the viewer is automatically presented with advertising clips at one or more points during playback. For instance, video advertisements may be superimposed into selected frames of a source video. A specific example may be an animation that appears and then disappears on the lower right corner of the video source. In other instances, video advertisements may be displayed in separate streams beside the source video stream. For example, a video advertisement may be presented in a separate viewing area during at least some duration of the source video playback. By presenting video advertisements simultaneously with the source video, the likelihood that the video advertisements will receive notice by the viewer may be enhanced.

The systems and methods in accordance with this disclosure determine one or more positions in the timeline of a source video stream where video advertisements may be inserted. These timeline positions may also be referred to as insertion points. According to various embodiments, the one or more insertion points may be positioned so that the impact of the inserted advertising clips on the viewer is maximized. The determination of video advertisement insertion points in a video source stream are described below with reference to FIGS. 1-12.

Exemplary Insertion Point Determination Concept

Figure 1:
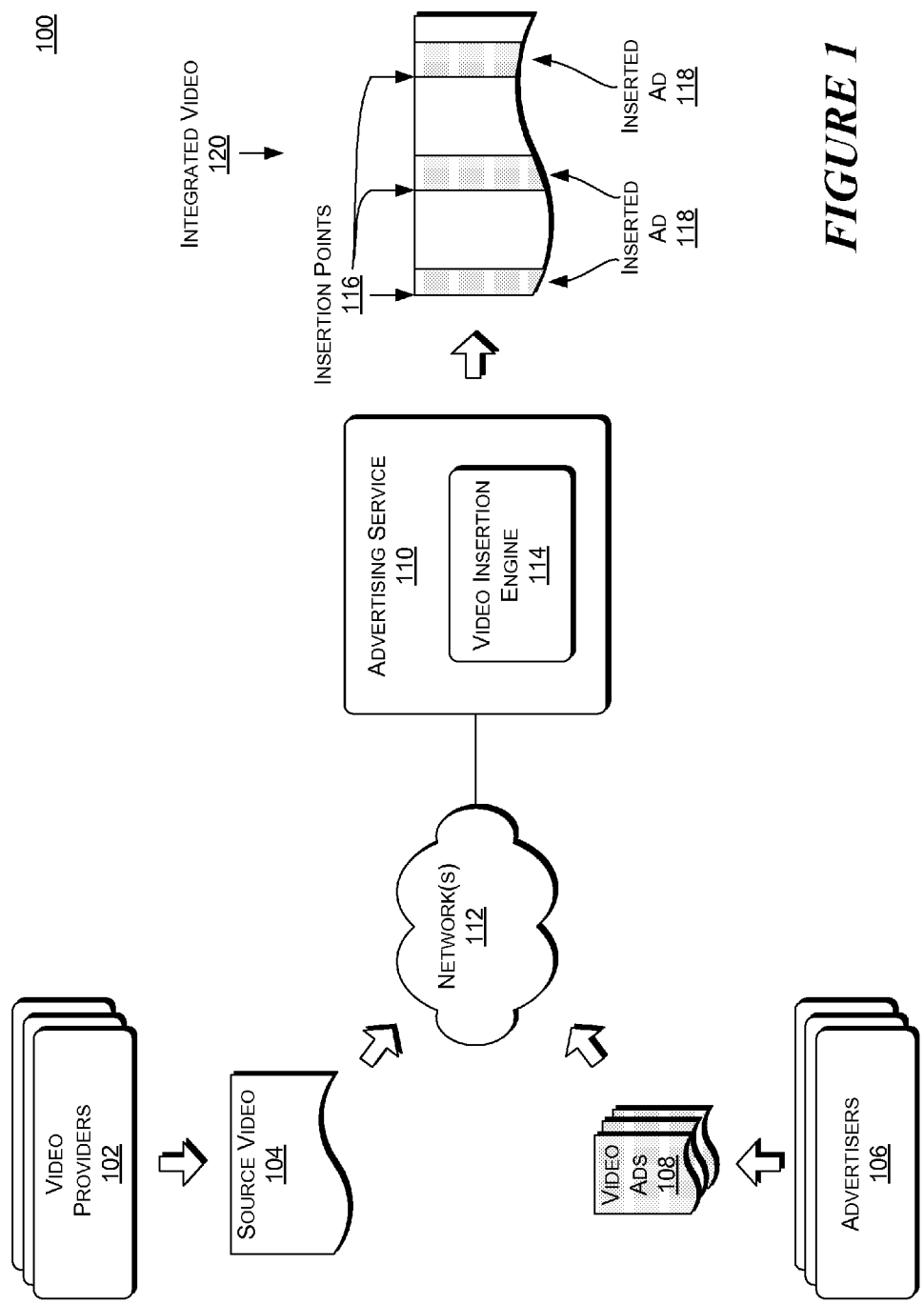
FIG. 1 is a simplified block diagram that illustrates an exemplary video advertisement insertion process.

FIG. 1 shows an exemplary video advertisement insertion system 100. The video advertisement insertion system 100 enables content providers 102 to provide video sources 104. The content providers 102 may include anyone who owns video content, and is willing to disseminate such video content to the general public. For example, the content providers 102 may include professional as well as amateur artists. The video sources 104 are generally machine-readable works that contain a plurality of images, such as movies, video clips, homemade videos, etc.

Advertisers 106 may produce video advertisements 108. The video advertisements 108 are generally one or more images intended to generate viewer interest in particular goods, services, or points of view. In many instances, a video advertisement 108 may be a video clip. The video clip may be approximately 10-30 seconds in duration. In the exemplary system 100, the video sources 104 and the video advertisements 108 may be transferred to an advertising service 110 via one or more networks 112. The one or more networks 112 may include wide-area networks (WANs), local area networks (LANs), or other network architectures.

The advertising service 110 is generally configured to integrate the video sources 104 with the video advertisements 108. Specifically, the advertising service 110 may use the video insertion engine 114 to match portions of the video source 104 with video advertisements 108. According to various implementations, the video insertion engine 114 may determine one or more insertion points 116 in the time line of the video source 104. The video insertion engine 114 may then insert one or more video advertisements 118 at the insertion points 116. The integration of the video source 104 and the one or more video advertisements 118 produces an integrated video 120. As further described below, the determination of locations for the insertion points 116 may be based on assessing the "discontinuity" and the "attractiveness" of a video boundary one or more video segments, or shots, which make up the video source 104.

Figure 2:
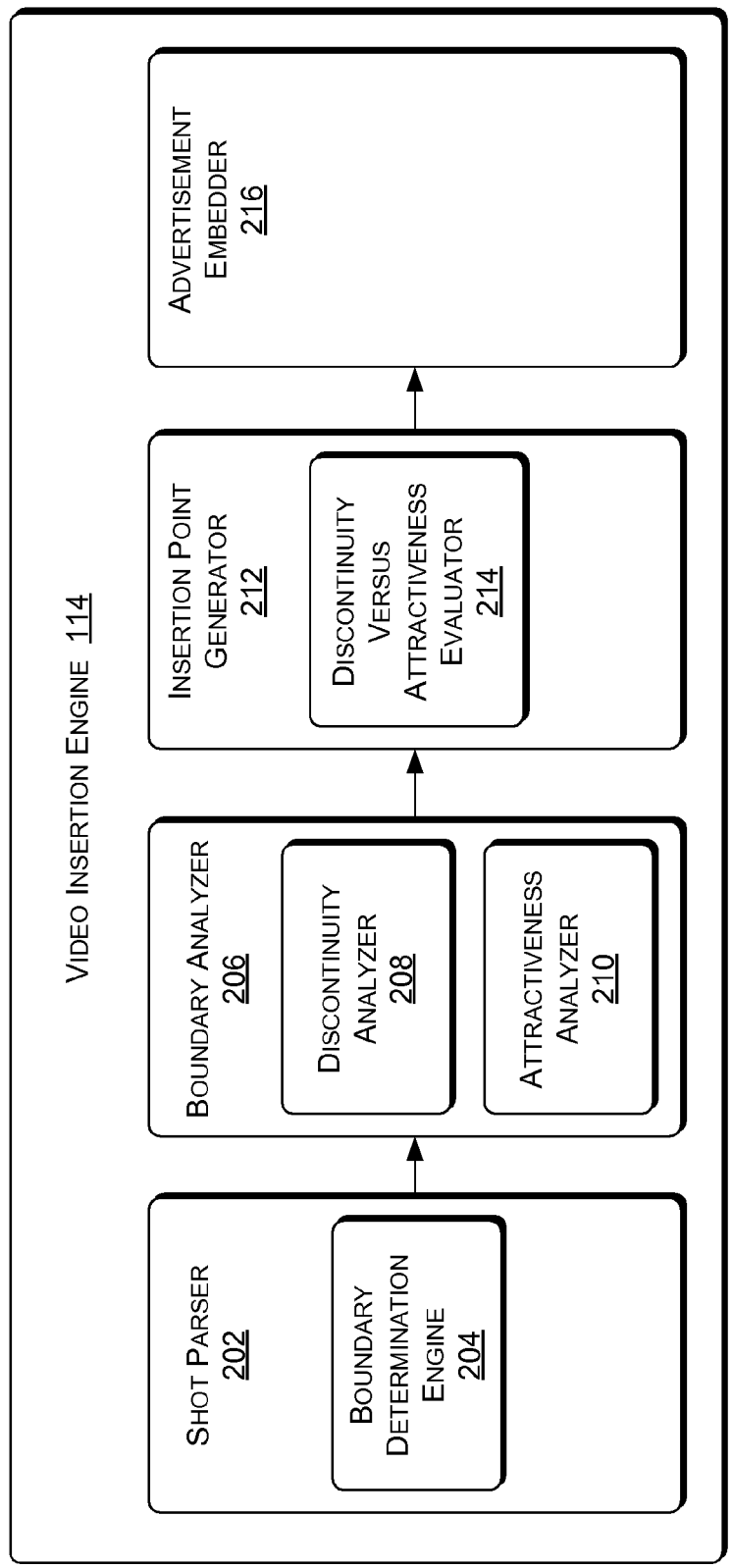
FIG. 2 is a simplified block diagram that illustrates selected components of a video insertion engine that may be implemented in the representative computing environment shown in FIG. 12.

FIG. 2 illustrates selected components of one example of the video insertion engine 114. The video insertion engine 114 may include computer-program instructions being executed by a computing device such as a personal computer. Program instructions may include routines, programs, objects, components, and data structures that perform particular tasks or implement particular abstract data types. However, the video insertion engine 114 may also be implemented in hardware.

The video insertion engine 114 may include shot parser 202. The shot parser 202 can be configured to parse a video, such as video source 104 into video segments, or shots. Specifically, the shot parser 202 may employ a boundary determination engine 204 to first divide the video source into shots. Subsequently, the boundary determination engine 204 may further ascertain the breaks between the shots, that is, shot boundaries, to serve as potential video advertisement insertion points. Some of the potential advertisement insertion points may end up being actual advertisement insertion points 116, as shown in FIG. 1.

The example video insertion engine 114 may also include a boundary analyzer 206. As shown in FIG. 2, the boundary analyzer 206 may further include a discontinuity analyzer 208 and an attractiveness analyzer 210. The discontinuity analyzer 208 may be configured to analyze each shot boundary for "discontinuity," which may further include "content discontinuity" and "semantic discontinuity." As described further below, "content discontinuity" is a measurement of the visual and/or audio discontinuity, as perceived by viewers. "Semantic discontinuity", on the other hand, is the discontinuity as analyzed by a mental process of the viewers. To put it another way, the "discontinuity" at a particular shot boundary measures the dissimilarity of the pair of shots that are adjacent the shot boundary.

Moreover, the attractiveness analyze 210 of the boundary analyzer 206 may be configured to compute a degree of "attractiveness" for each shot boundary. In general, the degree of "attractiveness" is a measurement of the ability of the shot boundary to attract the attention of viewers. As further described below, the attractiveness analyze 210 may use a plurality of user attention models, or mathematical algorithms, to quantify the attractiveness of a particular shot boundary. The "discontinuity" and "attractiveness" of one or more shot boundaries in a source video are then analyzed by an insertion point generator 212.

The insertion point generator 212 may detect the appropriate locations in the time line of the source video to serve as insertion points based on the discontinuity measurements and attractiveness measurements. As further described below, in some embodiments, the insertion point generator 212 may include an evaluator 214 that is configured to adjust the weights assigned to the "discontinuity" and "attractiveness" measurements of the shot boundaries to optimize the placement of the insertion points 116.

The video insertion engine 114 may further include an advertisement embedder 216. The advertisement embedder 216 may be configured to insert one or more video advertisements, such as the video advertisements 118, at the detected insertion points 116. According to various implementations, the video embedder 216 may insert the one or more video advertisements directly into the source video stream at the insertion points 116. Alternatively, the video embedder 216 may insert the one or more video advertisements by overlaying or superimposing the video advertisements onto one or more frames of the video source, such as video source 104, at the insertion points 116. In some instances, the video embedder 216 may insert the one or more video advertisements by initiating their display as separate streams concurrently with the video source at the insertion points 116.

FIG. 3 illustrates exemplary schemes for the determination of insertion point locations in the timeline of a source video. Specifically, the schemes weigh the "attractiveness" and "discontinuity" measurements of the various shots in the video source. For these measurements, insertion point locations may be determined based on the balancing of "attractiveness" and "intrusiveness" considerations.

According to various implementations, "intrusiveness" of the video advertisement insertion point may be defined as the interruptive effect of the video advertisement on a viewer who is watching a playback of the video source stream. For example, a video advertisement in the form of an "embedded" animation is likely to be intrusive if it appears during a dramatic point (e.g., a shot or a scene) in the story being presented by the source video. Such presentation of the video advertisement may distract the viewer and detract from the viewer's ability to derive enjoyment from the story. However, the likelihood that the viewer will notice the video advertisement may be increased. In this way, as long as the intrusiveness of the video advertisement insertion point does not exceed viewer tolerance, the owner of the video advertisement may derive increased benefit. Thus, more "intrusive" video advertisement insertion points weigh the benefit to advertisers more heavily than the benefit to video source viewers.

Conversely, if an insertion point is configured so the video advertisement is displayed during a relatively uninteresting part of a story presented by the video source, the viewer is likely to feel less interrupted. Uninteresting parts of the video source may include the ends of a story or scene, or the finish of a shot. Because these terminations are likely to be natural breaking points, the viewer may perceive the video advertisements inserted at these points as less intrusive. Consequently, less "intrusive" video advertisement insertion points place a great emphasis on the benefit to viewers than the benefit to advertisers.

According to various embodiments, the "attractiveness" of a video advertisement insertion point is dependent upon the "attractiveness" of an associated video segment. Further, the "attractiveness" of a particular video segment may be approximate by the degree that the content of the video segment attracts viewer attention. For example, images that zoom in/out of view, as well as images that depict human faces, are generally ideal for attracting viewer attention.

Thus, if a video advertisement is shown close in time with a more "attractive" video segment, the video advertisement is likely to be perceived by the viewer as more "attractive." Conversely, if a video advertisement is shown close in time to a video segment that is not as "attractive", such as a relatively boring or uninteresting segment, the viewer is likely to deem the video advertisement as less "attractive." Because more "attractive" video advertisement insertion points are generally closer in time to more "attractive" video segments, having a more "attractive" insertion point may be considered to be placing a greater emphasis on the benefit to advertisers. On the other hand, because less "attractive" video advertisement insertion points are approximate less "attractive" video segments, having a less "attractive" video advertisement insertion point may be considered to be weighing the benefit to the viewers more heavily than the benefit to advertisers.

As shown in FIG. 3, if the attractiveness of a video segment may be denoted by A, and the discontinuity of the video segment may be denoted by D, there are four combination scheme 302-308 that balance A and D during the detection of video advertisement insertion points. Additionally, α and β represent two parameters (non-negative real numbers), each of which can be set to 3. The measurements of A and D, as well as the combination of attractiveness and discontinuity represented by A and D, will be described below. According to various embodiments, the four combination schemes are configured to provide video advertisement insertion locations based on the desired "attractiveness" to "intrusiveness" proportions.

Exemplary Processes

FIGS. 4-7 illustrate exemplary processes of determination of video advertisement insertion points. The exemplary processes in FIGS. 4-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the video insertion engine 114 of FIG. 1, although they may be implemented in other system architectures.

FIG. 4 shows a process 400 for determining video advertisement insertion points. At block 402, the boundary determination engine 204 of the shot parser 202 may implement a pre-processing step to parse a source video V into Ns shots.

According to some embodiments, the shot parser 202 may parse the source video V into Ns shots based on the visual details in each of the shots. In these embodiments, the parsing of the source video into a plurality of shots may employ a pair-wise comparison method to detect a qualitative change between two frames. Specifically, the pair-wise comparison method may include the comparison of corresponding pixels in the two frames to determine how many pixels have changed. In one implementation, a pixel is determined to be changed if the difference between its intensity values in the two frames exceeds a given threshold t. The comparison metric can be represented as a binary function $D\,P_i(k, l)$ over the domain of two-dimensional coordinates of pixels, $(k,l)$, where the subscript i denotes the index of the frame being compared with its successor. If $P_i(k,l)$ denotes the intensity value of the pixel at coordinates $(k,l)$ in frame i, then $D\,P_i(k,l)$ may be defined as follows:

$$DP_i(k, l) = \begin{cases} 1 & \text{if } |P_i(k, l) - P_{i+1}(K, l)| > t \\ 0 & \text{otherwise} \end{cases} \quad (1)$$

The pair-wise segmentation comparison method counts the number of pixels changed from one frame to the next according to the comparison metric. A segment boundary is declared if more than a predetermined percentage of the total number of pixels (given as a threshold T) has changed. Since the total number of pixels in a frame of dimensions M by N is M*N, this condition may be represented by the following inequality:

$$\frac{\sum_{k,l=1}^{M,N} DP_i(k, l)}{M*N} *100 > T \quad (2)$$

In particular embodiments, the boundary determination engine 204 may employ the use of a smoothing filter before the comparison of each pixel. The use of a smoothing filter may reduce or eliminate the sensitivity of this comparison method to camera panning. The large number of objects moving across successive frames, as associated with camera panning, may cause the comparison metric to judge that a large number of pixels as changed even if the pan entails the shift of only a few pixels. The smooth filter may serve to reduce this effect by replacing the value of each pixel in a frame with the mean value of its nearest neighbors.

In other embodiments, the parsing of the source video into a plurality of shots may make use of a likelihood ratio method. In contrast to the pair-wise comparison method described above, the likelihood ratio method may compare corresponding regions (blocks) in two successive frames on the basis of second-order statistical characteristics of their intensity values. For example, if $m_i$ and $m_{i+1}$ denote the mean intensity values for a given region in two consecutive frames, and $S_i$ and $S_{i+1}$ denote the corresponding variances, the following formula computes the likelihood ratio and determines whether or not it exceeds a given threshold t:

$$\frac{\left[\frac{S_i + S_i + 1}{2} + \left(\frac{m_i + m_{i+1}}{2}\right)^2\right]^2}{S_i * S_{i+1}} > t \quad (3)$$

By using this formula, breaks between shots may be detected by first partitioning the frames into a set of sample areas. A break between shots may then be declared whenever the total number of sample areas with likelihood ratio that exceed the threshold t is greater than a predetermined amount. In one implementation, this predetermined amount is dependent on how a frame is partitioned.

In alternative embodiments, the boundary determination engine 204 may parse the source video into a plurality of shots using an intensity level histogram method. Specifically, the boundary determination engine 204 may use a histogram algorithm to develop and compare the intensity level histograms for complete images on successive frames. The principle behind this algorithm is that two frames having an unchanging background and unchanging objects will show little difference in their respective histograms. The histogram comparison algorithm may exhibit less sensitivity to object motion as it ignores spatial changes in a frame.

For instance, if $H_i(j)$ denote the histogram value for the i-th frame, where j is one of the G possible grey levels, then the difference between the i-th frame and its successor will be given by the following formula:

$$SD_i = \sum_{j=1}^{G} |H_i(j) - H_{i+1}(j)| \quad (4)$$

In such an instance, if the overall difference $SD_i$ is larger than a given threshold T, a shot boundary may be declared. To select a suitable threshold T, $SD_i$ can be normalized by dividing it by the product of G and M*N. As described above, M*N represents the total number of pixels in a frame of dimensions M by N. Additionally, it will be appreciated that the number of histogram bins for the purpose of denoting the histogram values may be selected on the basis of the available grey-level resolution and the desired computation time. In additional embodiments, the boundary determination engine 204 may use a twin-comparison method to detect gradual transitions between shots in a video source. The twin-comparison method is shown in FIG. 8.

Figure 8:
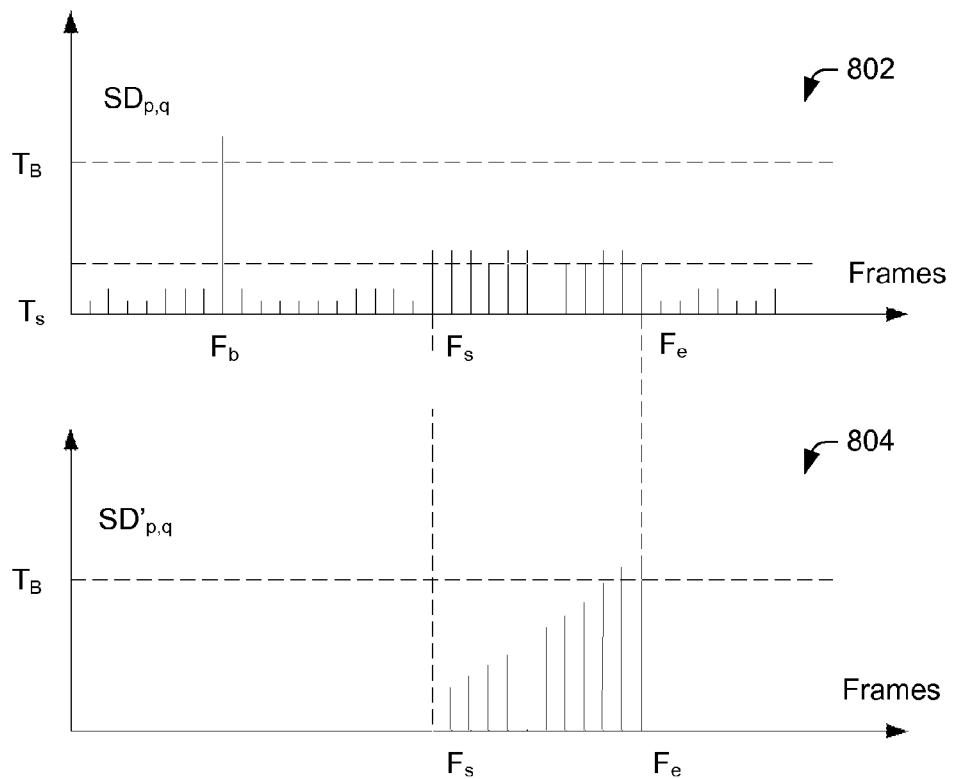
FIG. 8 is a diagram that illustrates the use of the twin-comparison method on consecutive frames in a video segment, such as a shot from a video source, using the representative computing environment shown in FIG. 12.

FIG. 8 illustrates the use of the twin-comparison method on consecutive frames in a video segment, such as a shot from a video source. As shown in graph 802, the twin-comparison method uses two cutoff thresholds: $T_b$ and $T_s$. $T_b$ represents a high threshold. The high threshold may be obtained using the likelihood ratio method described above. $T_s$ represents a low threshold. $T_s$ may be determined via the comparison of consecutive frames using a difference metric, such as the difference metric in Equation 4.

First, wherever the difference value between the consecutive frames exceeds threshold $T_b$, the twin-comparison method may recognize the location of the frame as a shot break. For example, the location $F_b$ may be recognized as a shot break because it has a value that exceeds the threshold $T_b$.

Second, the twin-comparison method may be also capable of detecting differences that are smaller than $T_b$ but larger than $T_s$. Any frame that exhibits such a difference value is marked as the potential start ($F_s$) of a gradual transition. As illustrated in FIG. 8, the frame having a difference value between the thresholds $T_b$ and $T_s$ is then compared to subsequent frames in what is known as an accumulated comparison. The accumulation comparison of consecutive frames, as defined by the difference metric $SD'_{p,q}$, is shown in graph 804. During a gradual transition, the difference value will normally increase. Further, the end frame (Fe) of the transition may be detected when the difference between consecutive frames decreases to less than $T_s$ while the accumulated comparison has increased to a value larger than $T_b$.

Further, the accumulated comparison value is only computed when the difference between consecutive frames exceeds $T_s$. If the consecutive difference value drops below $T_s$ before the accumulated comparison value exceeds $T_b$, then the potential starting point is dropped and the search continues for other gradual transitions. By being configured to detect the simultaneous satisfaction of two distinct threshold conditions, the twin-comparison method is configured detect gradual breaks between as well as ordinary breaks between shots.

In other embodiments, the shot parser 202 may parse the source video V into Ns shots based on the audio stream in the source video. The audio stream is the audio signals that correspond to the visual images of the source video. In order to parse the source video into shots, the shot parser 202 may be configured to first select for features that reflect optimal temporal and spectral characteristics of the audio stream. These optimal features may include: (1) features that are selected using melfrequency cepstral coefficients (MFCCs); and (2) perceptual features. These features may then be combined as one feature vector after normalization.

Before feature extraction, the shot parser 202 may convert the audio stream associated with the source video into a general format. For example, the shot parser 202 may convert the audio stream into an 8 KHz, 16-bit, mono-channel format. The converted audio stream may be pre-emphasized to equalize any inherent spectral tilt. In one implementation, the audio steam of the source video may then be further divided non-overlapping 25 ms-long frames for feature extraction.

Subsequently, the shot parser 202 may use eight-order MFCCs to select for some of the features of the video source audio stream. The MFCCs may be expressed as:

$$c_n = \sqrt{\frac{2}{K}} \sum_{k=1}^{K} (\log S_k) \cos[n(k - 0.5)\pi / K] \quad (5)$$

$$n = 1, 2, \ldots L$$

where K is the number of band-pass filters, $S_k$ is the Mel-weighted spectrum after passing k-th triangular band-pass filter, and L is the order of the cepstrum. Since eight-order MFCCs are implemented in the embodiment, L=8.

As described above, perceptual features may also reflect optimal temporal and spectral characteristics of the audio stream. These perceptual features may include: (1) zero crossing rates (ZCR); (2) short time energy (STE); (3) sub-band powers distribution; (4) brightness, bandwidth, spectrum flux (SF); (5) band periodicity (BP), and (6) noise frame ratio (NFR).

Zero-crossing rate (ZCR) can be especially suited for discriminating between speech and music. Specifically, speech signals typically are composed of alternating voiced sounds and unvoiced sounds in the syllable rate, while music signals usually do not have this kind of structure. Hence, the variation of zero-crossing rate for speech signals will generally be greater than that for music signals. ZCR is defined as the number of time-domain zero-crossings within a frame. In other words, the ZCR is a measurement of the frequency content of a signal:

$$ZCR = \frac{1}{2(N-1)} \sum_{m=1}^{N-1} |sgn[x(m+1)] - sgn[x(m)]| \quad (6)$$

where sgn[.] is a sign function and x(m) is the discrete audio signal, m=1 ... N.

Likewise, Short Term Energy (STE) is the spectrum power of the audio signal associated with a particular frame in the source video. The shot parser 202 may use the STE algorithm to discriminate speech from music. STE may be expressed as:

$$STE = \log\left(\int_0^{w_0} |F(x)|^2 dw\right) \quad (7)$$

where F(w) denotes the Fast Fourier Transform (FFT) coefficients, $|F(w)|^2$ is the power at the frequency w, and $w_0$ is the half sampling frequency. The frequency spectrum may be divided into four sub-bands with intervals $\left[0, \frac{w_0}{8}\right]$, $\left[\frac{w_0}{8}, \frac{w_0}{4}\right]$, $\left[\frac{w_0}{4}, \frac{w_0}{2}\right]$, and $\left[\frac{w_0}{2}, w_0\right]$.

Additionally, the ratio between sub-band power and total power in a frame is defined as:

$$D = \frac{1}{STE} \int_{L_j}^{H_j} |F(w)|^2 dw \quad (8)$$

where $L_j$ and $H_j$ are lower and upper bound of sub-band j, respectively.

Brightness and bandwidth represent the frequency characteristics. Specifically, the brightness is the frequency centroid of the audio signal spectrum associated with a frame. Brightness can be defined as:

$$w_c = \frac{\int_0^{w_0} w|F(w)|^2 dw}{\int_0^{w_0} |F(w)|^2 dw} \quad (9)$$

Bandwidth is the square root of the power-weighted average of the squared difference between the spectral components and frequency centroid:

$$B = \sqrt{\frac{\int_0^{w_0} (w - w_c)^2 |F(w)|^2 dw}{\int_0^{w_0} |F(w)|^2 dw}} \quad (10)$$

Brightness and Bandwidth may be extracted for the audio signal associated with each frame in the source video. The shot parser 202 may then compute the means and standard deviation for the audio signals associated with all the frames in the source video. In turn, the means and standard deviation represent a perceptual feature of the source video.

Spectrum Flux (SF) is the average variation value of spectrum in the audio signals associated with two adjacent frames in a shot. In general, speech signals are composed of alternating voiced sounds and unvoiced sounds in a syllable rate, while music signals do not have this kind of structure. Hence, the SF of a speech signal is generally greater than the SF of a music signal. SF may be especially useful for discriminating some strong periodicity environment sounds, such as a tone signal, from music signals. SF may be expressed as:

$$SF = \quad (11)$$

$$\frac{1}{(N-1)(K-1)} \times \sum_{n=1}^{N-1} \sum_{k=1}^{K-1} [\log(A(n,k) + \delta) - \log(A(n-1,k) + \delta)]^2$$

where $$A(n,k) = \left| \sum_{m=-\infty}^{\infty} x(m)w(nL - m)e^{-j\frac{2\pi}{L}km} \right| \quad (12)$$

and x(m) is the is the input discrete audio signal, w(m) the window function, L is the window length, K is the order of discrete Fourier transform (DFT), δ a very small value to avoid calculation overflow, and N is the total number of frames in source video.

Band periodicity (BP) is the periodicity of each sub-band. BP can be derived from sub-band correlation analysis. In general, music band periodicities are much higher than those of environment sound. Accordingly, band periodicity is an effective feature in music and environment sound discrimination. In one implementation, four sub-bands may be selected with intervals $\left[0, \frac{w_0}{8}\right]$, $\left[\frac{w_0}{8}, \frac{w_0}{4}\right]$, $\left[\frac{w_0}{4}, \frac{w_0}{2}\right]$, and $\left[\frac{w_0}{2}, w_0\right]$.

The periodicity property of each sub-band is represented by the maximum local peak of the normalized correlation function. For example, the BP of a sine wave may be represented by 1, and the BP for white noise may be represented by 0. The normalized correlation function is calculated from a current frame and a previous frame:

$$r_{i,j} = \frac{\sum_{m=0}^{M-1} s_i(m-k)s_i(m)}{\sqrt{\sum_{m=0}^{M-1} s_i^2(m-k)} \sqrt{\sum_{m=0}^{M-1} s_i^2(m)}} \quad (13)$$

where $r_{i,j}(k)$ is the normalized correlation function; i is the band index, and j is the frame index. $s_i(n)$ is the i-th sub-band digital signal of current frame and previous frame, when n<0, the data is from the previous frame. Otherwise, the data is from the current frame. M is the total length of a frame.

Accordingly, the maximum local peak may be denoted as $r_{i,j}(k_p)$, where $k_p$ is the index of the maximum local peak. In other words, $r_{i,j}(kp)$ is the band periodicity of the i-th sub-band of the j-th frame. Thus, the band periodicity may be calculated as:

$$bp_i = \frac{1}{N} \sum_{j=1}^{N} r_{i,j}(k_p) \quad i = 1, \ldots, 4 \qquad (14)$$

where $bp_i$ is the band periodicity of i-th sub-band, N is the total number of frames in the source video.

The shot parser 202 may use noise frame ratio (NFR) to discriminate environment sound from music and speech, as well as discriminate noisy speech from pure speech and music more accurately. NFR is defined as the ratio of noise frames to non-noise frames in a given shot. A frame is considered as a noise frame if the maximum local peak of its normalized correlation function is lower than a pre-set threshold. In general, the NFR value of noise-like environment sound is higher than that for music, because there are much more noise frames.

Finally, shot parser 202 may concatenated the MFCC features and the perceptual features into a combined vector. In order to do so, shot parser 202 may normalize each feature to make their scale similar. The normalization is processed as $x'_i = (x_i - \mu_i)/\sigma_i$, where $x_i$ is the i-th feature component. The corresponding mean and standard derivation $\sigma_i$ can also be calculated. The normalized feature vector is the final representation of the audio stream of the source video.

Once the shot parser 202 has determined a final representation of the audio stream of the video source, the shot parser 202 may be configured to employ support vectors machines (SVMs) to segment the source video into shots based on the final representation of the audio stream of the source video. Support vector machines (SVMs) are a set of related supervised learning methods used for classification.

In one implementation, the audio stream of the source video may into classified into five classes. These classes may include: (1) silence, music, (2) background sound, (3) pure speech, and (4) non-pure speech. In turn, non-pure speech may include (1) speech with music, and (2) speech with noise. Initially, the shot parser 202 may classify the audio stream into silent and non-silent segments depending on the energy and zero-crossing rate information. For example, a portion of the audio stream may be marked as silence if the energy and zero-crossing rate is less than a predefined threshold.

Subsequently, a kernel SVM with a Gaussian Radial Basis function may be used to further classify the non-silent portions of the audio stream in a binary tree process. The kernel SVM may be derived from a hyper-plane classifier, which is represented by the equation:

$$f(x) = \operatorname{sgn}\left(\sum_{i=1}^{l} \overline{\alpha_i} y_i x_i \cdot x + \overline{b}\right) \qquad (15)$$

where $\overline{\alpha}$ and $\overline{b}$ are parameters for the classifier, and the solution vector $x_i$ is called as the Supper Vector with $\overline{\alpha_i}$ being non-zero. The kernel SVM is obtained by replacing the inner product $x \cdot y$ by a kernel function $K(x,y)$, and then constructing an optimal separating hyper-plane in a mapped space. Accordingly, the kernel SVM may be represented as:

$$f(x) = \operatorname{sgn}\left(\sum_{i=1}^{l} \overline{\alpha_i} y_i K(x_i, x) + \overline{b}\right) \qquad (16)$$

Moreover, the Gaussian Radial Basis function may be added to the kernel SVM by the equation $$K(x, y) = \exp -\frac{\|x - y\|^2}{2\sigma^2}.$$

According to various embodiments, the use of the kernel SVMs with the Gaussian Radial Basis function to segment the audio stream, and thus the video source corresponding to the audio stream into shots, may be carried out in several steps. First, the video stream is classified into speech and non-speech segments by a kernel SVM. Then, the non-speech segment may be further classified into shots that contain music and background sound by a second kernel SVM. Likewise, the speech segment may be further classified into pure speech and non-pure speech shots by a third kernel SVM.

It will be appreciated that while some methods for detecting breaks between shots in a video source has been illustrated and described, the boundary determination engine 204 may carry out the detection of breaks using other methods. Accordingly, the exemplary methods discussed above are intended to be illustrative rather than limiting.

Once the source video V is parsed into $N_s$ shots using one of the methods described above, $s_i$ may be used to denote the i-th shot in V. Accordingly, $V=\{s_i\}$, wherein $i=1, \ldots, N_s$. As a result, the total number of candidate insertion points may be represented by $(N_s+1)$. The relationships between candidate insertion points and the parsed shots are illustrated in FIG. 9.

Figure 9:
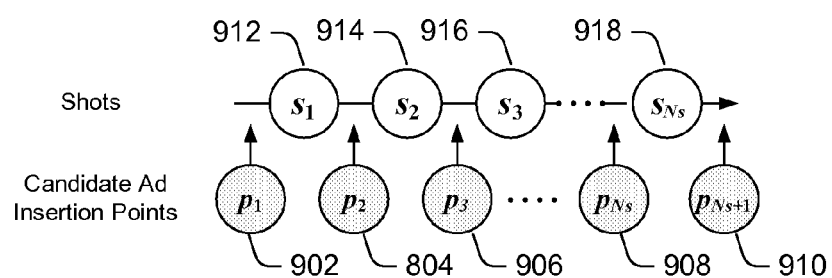
FIG. 9 is a diagram that illustrates the proximity of video advertisement insertion points to a plurality parsed shots in a source video.

FIG. 9 illustrates the proximity of the video advertisement insertion points to the parsed shots $S_{N_s}$ in the source video V. As shown, the insertion points 902-910 are distributed between the shots 912-918. According to various embodiments, the candidate insertion potions correspond to shot breaks between the shots.

At block 404, the discontinuity analyzer 208 of the boundary analyzer 206 may determine the overall discontinuity of each shot in the source video. Specifically, in some embodiments, the overall discontinuity of the each shot may include a "content discontinuity." Content discontinuity measures the visual and or audile perception-based discontinuity, and may be obtained using a best first model merging (BFMM) method.

Specifically, given the set of shots $\{s_i\}$ ($i=1, \ldots, Ns$) in a source video, the discontinuity analyzer 208 may use a best first model merging (BFMM) method to merge the shots into a video sequence. As described above, the shots may be obtained based on parsing a source video based on the visual details of the source video. Alternatively, the shots may be obtained by segmentation of the source video based on the audio stream that corresponds to the source video. Accordingly, the best first model merging (BFMM) may be used merge the shots in sequence based on factors such as color similarity between shots, audio similarity between shots, or a combination of these factors.

The merging of the shots may be treated as an ordered clustering of a group of consecutive time constrained shots. In one implementation, the shots of the video source may be regarded as a hidden state variable. Accordingly, the clustering problem may then involve the looping of boundaries between shots as the probabilistic of transition to the next states. According to various embodiments, probabilistic clustering may be used to carry out BFMM. Probabilistic clustering creates a conditional density model of the data, where the probability of generating a shot depends conditionally upon the cluster membership of the shot. In such an instance, the clustering metric is the likelihood of the data being generated by the model. In other words, BFMM is based on a formulation of maximum likelihood.

Figure 10:
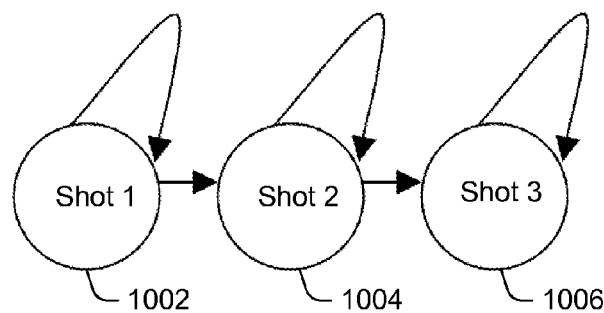
FIG. 10 is a diagram that illustrates a Left-Right Hidden Markov Model that is included in a best first merge model (BFMM).

As shown in FIG. 10, the probabilistic model used may be a Left-Right Hidden Markov Model (HMM) 1000. Membership in the video sequence is a hidden state variable. For every state, there is a generative model for shots in that state. This generative model is content based. This means that a probability of generating the data of the shot, such as one of the shots 902-906, is conditioned on the state. In addition, for every state, there is a probability of transitioning to the next state when presented with a new shot.

BFMM may be initiated with every shot having its own model. Merging a pair of adjacent models causes a loss of data likelihood, because one combined model is more general and cannot fit the data as well as two individual models. For example, if $L_x$ is the log likelihood of all of the images assigned to a shot x given an associated model of x, and if shot x and y are being merged to form video sequence z, then the change in likelihood associated with the merging is:

$$\Delta L = L_z - L_x - L_y \tag{17}$$

At each merging step, the Best-First Model Merging algorithm may selectively merge the two adjacent shots with the most similarity, so that the merge causes the least loss of data likelihood. Additionally, a merging order may be assigned to the boundary between the two merged shots. This merging step may be repeated until all the shots in V are merged into one video sequence.

In this way, if $P=\{p_i\}$ (i=2, ..., $N_s$) denote the set of inserting points, a merging order for each shot break $p_i$ (i=2, ..., $N_s$-1) may be obtained. Moreover, the content discontinuity $D_c$ for each shot break $p_i$ may be further calculated. For example, if the shots $s_1$ and $s_{i+1}$ are merged in the k step, then $P_i$=k and the content discontinuity $D_c$ may be given as $D_c(p_i)=k/(N_s+1)$.

An exemplary pseudo code for the determination of content discontinuity, which may be carried out by the discontinuity analyzer 208, is given below:

```
Input: S={s_i} i=1, ..., N_s, P={p_j} j=1, ..., N_s+1
Output: D={D_c(p_j)} j=1, ..., N_s+1
1.   Initialize
     set D_c(p_{Ns+1}) = 1.00, D_c(p_1) = 0.99
2.   Preprocess
     for σ=1 to 4 do
       Compute similarity Sim(s_i, s_{i+σ}) for each pair with scale σ
       if Sim(s_i, s_{i+σ})<T_s do
         Merge {s_k} (k=i+1, ..., i+σ) to s_i and Remove {s_k} (k=i+1, ..., i+σ)
         from S
         {D_c(p_k)}(k= i+1, ..., i+σ)=0
         N_s = N_s - (σ-1)
       end if
     end for
3.   BFMM
     set merging order N_m=1
     while N_s>0 do
       Compute Sim(·) for adjacent shots and get the closest pair (s_i, s_{i+1})
       Merge s_{i+1} to s_i and Remove s_{i+1} from S
       D_c(p_{i+1}) = N_m
       N_m ++, N_s --
     end while
4.   Normalize
     for j=2 to N_s do
       D_c(p_j) = D_c(p_j) / N_m
     end for
```

In other embodiments, the overall discontinuity of the each shot, in addition to "content discontinuity" may include "semantic discontinuity." Semantic discontinuity may be derived using concept detectors that are based on Support Vector Machines (SVM). Support vector machines (SVMs) are a set of related supervised learning methods used for classification. Each of the concept detectors is configured to detect a particular attribute of a shot. For instance, the discontinuity analyzer 208 may include concept detectors that may be configured to detect various attributes. These attributes may include whether the shot is an indoor shot, whether the shot shows an urban scene, whether the shot depicts a person, whether the shot depicts a water body, etc. In other instances, the discontinuity analyzer 208 may also include concept detectors that are used to detect attributes such as camera motions. These camera motions may include affine motions such as static, pan, tilt, zoom, rotation, as well as object motions. Nevertheless, it will be appreciated that the discontinuity analyzer 208 may include additional concept detectors that are configured to detect other attributes of the shots, including other types of motions.

In these embodiments, each concept detector may be further configured to output a confidence score for a shot. The confidence score indicates the degrees of correlation between the shot and the corresponding attribute detected by the concept detector. Accordingly, for each shot, the plurality of confidence scores may be composed into a multi-dimensional vector. The semantic discontinuity for each shot break, $D_s(p_i)$ may then be calculated by the distance, that is, difference, between two multi-dimensional vectors adjacent the an insertion point $p_i$.

Accordingly, "content discontinuity" and "semantic discontinuity" may be calculated for two types of shots breaks. In one instance, "content discontinuity" and "semantic discontinuity" may be calculated for shot breaks belonging to shots that were parsed using visual details of the source video (visual shot boundaries). In another instance, "content discontinuity" and "semantic discontinuity" may be calculated for shot breaks belonging to shots that were parsed using the audio stream of the source video (audio shot boundaries).

Moreover, in embodiments where the overall discontinuity includes both "content discontinuity" and "semantic discontinuity", an overall discontinuity, $D(p_i)$, may be calculated as the average of "content discontinuity", $D_c(p_i)$, and "semantic discontinuity," $D_s(p_i)$. In additional embodiments, the overall discontinuity, $D(p_i)$, may be calculated as the sum of weighted of "content discontinuity", $D_c(p_i)$, and "semantic discontinuity," $D_s(p_i)$, as shown by the equation:

$$D(p_i)=\lambda D_c(p_i)+(1-\lambda)D_s(p_i) \tag{18}$$

wherein λ is a number between 0 and 1.

At block 406, the attractiveness analyze 210 of the boundary analyzer 206 may determine the attractiveness of each shot in the video source. In one embodiment, attractive of each shot may be based on an estimate of the degree which the content of the shot will attract viewer attention. In other words, the ability of a particular shot to attract viewer attention may be used as an approximation of attractiveness.

According to various implementations, a shot in the video source may be considered to be a compound of image sequence, audio track, and textural information. The image sequences in the shot may present motion (object motion and camera motion), color, texture, shape, and text. The audio channels may consist of speech, music, and various sound effects. Textural information in linguistic form may be obtained from sources such as closed captioning, automatic speech recognition (ASR), and superimposed text.

Figure 5:
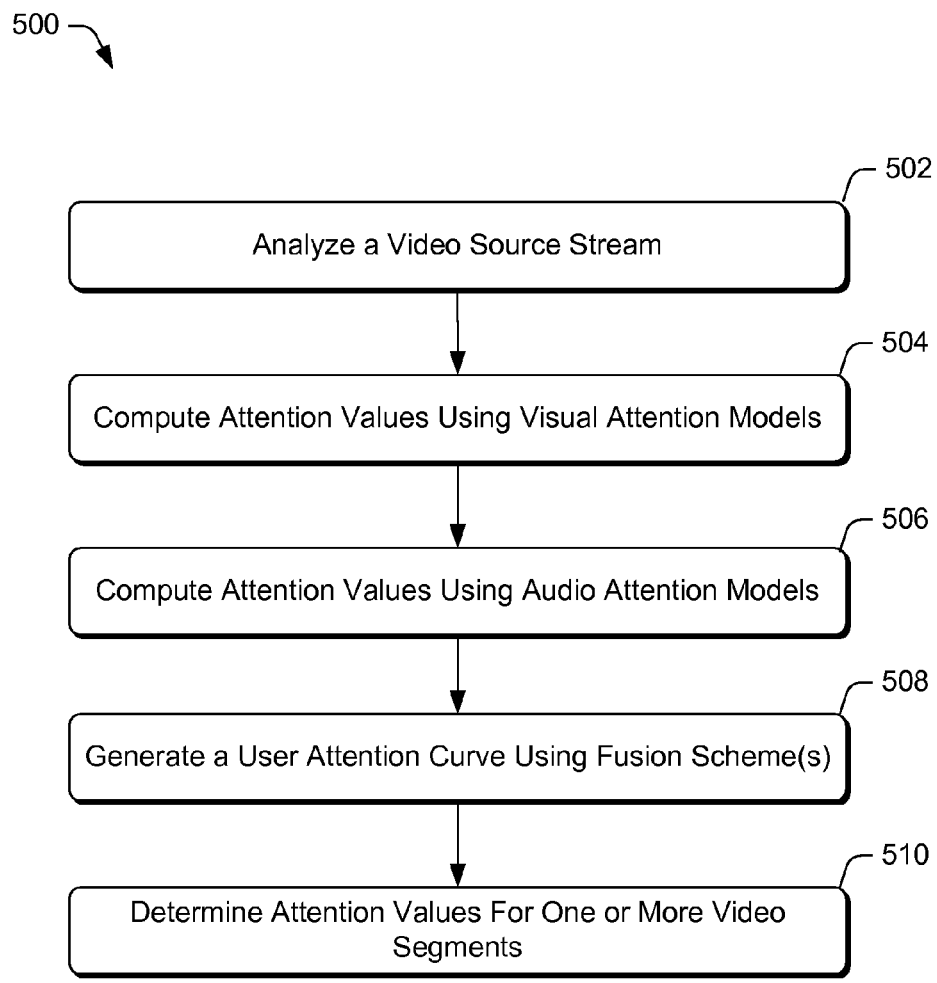
FIG. 5 depicts an exemplary flow diagram for gauging viewer attention using the representative computing environment shown in FIG. 12.

FIG. 5 shows a process 500 that gauges viewer attention. At block 502, the attractiveness analyze 210 may analyze a shot to extract content features. For example, the shot may be broke down into visual elements, aural elements, and linguistic elements. At block 504, the attractiveness analyze 210 may use a set of attention models to generate separate attention curves for the elements.

Figure 6:
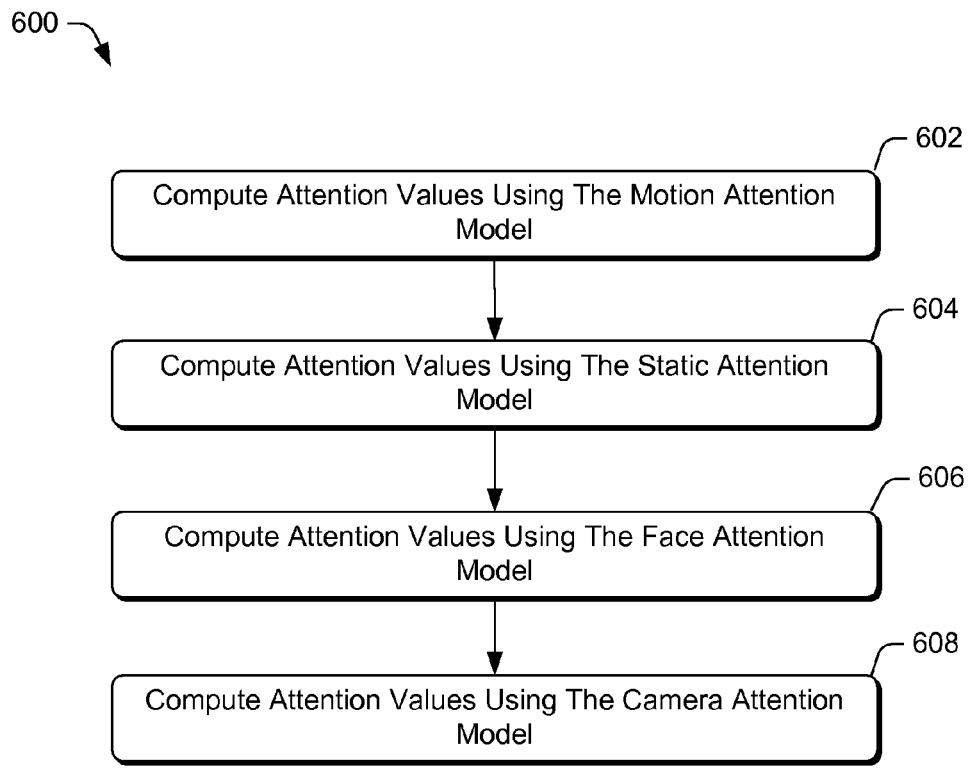
FIG. 6 is a flow diagram showing an illustrative process gauging visual attention using the representative computing environment shown in FIG. 12.

For instance, attention to visual elements may be modeled by several attention models. These models may include a motion attention model, a static attention model, a semantic attention model (face attention model), and a guided attention model (camera motion model). FIG. 6 further illustrates block 504 of the process 500 by depicting the use of these models.

FIG. 6 shows an exemplary process 600 for using the various attention models. At block 602, the motion attention model may be implemented by the attractiveness analyze 210. In the motion attention model, motion attention is estimated based on a motion vector field (MVF). A MVF can be obtained by block-based motion estimation. In other words, for a given frame in a shot, the motion field between the frame and the next frame may be extracted and calculated as a set of motion characteristics. In one implementation, when the shot is stored in MPEG format, the MVFs may be extracted from the MPEG data directly.

A MVF may have three inductors: intensity inductor, spatial coherence inductor, and temporal coherence inductor. When motion vectors in the MVFs pass these inductors, they may be transformed into three kinds of visual maps. The visual maps may include intensity map, spatial coherence map, and temporal coherence map, respectively. The normalized outputs from the three inductors are fused into a saliency map. The saliency map may indicate spatial-temporal distribution of motion attentions.

The MVF may include macro blocks, each macro block may correspond to the three inductors describe above. The intensity inductor at each macro block induces motion energy or activity, which may be represented by motion intensity I. Specifically, given a MVF with M*N macro blocks, the motion intensity at each macro block $MB_{i,j}$ (0≤i≤M, 0≤i≤N) may be computed as the magnitude of motion vectors:

$$I(i,j) = \sqrt{dx^2_{i,j} + dy^2_{i,j}} / \text{MaxMag} \quad (19)$$

where ($dx_{i,j}$, $dy_{i,j}$), denote two components of motion vector along the x-axis and y-axis, respectively, and where MaxMag is the normalization vector.

The spatial coherence inductor induces the spatial phase consistency of motion vectors. The regions with consistent motion vectors are most likely within a moving object. In contrast, the motion vectors with inconsistent phase are often located at object boundaries. Spatial coherency may be measured using an entropy based method. First, a phase histogram in a spatial window with the size of w*w (pixels) may be computed at each location of a macro block. Then, the coherence of phase distribution, Cs, may be measured by entropy:

$$Cs(i,j) = -\sum_{t=1}^{n} p_s(t) \text{Log}(p_s(t)) \quad (20)$$

$$P_s(t) = \frac{SH^w_{i,j}(t)}{\sum_{k=1}^{n} SH^w_{i,j}(k)} \quad (21)$$

where $SH^w_{i,j}(t)$ is a spatial phase histogram and the corresponding probability distribution function of spatial phase is $p_s(t)$, and n is the number of histogram bins.

Similar to the spatial coherence inductor, temporal coherency, Ct, or the output of a temporal coherence inductor, may be defined in a sliding window with the size of L (frames) as follows:

$$Ct(i,j) = -\sum_{t=1}^{n} p_t(t) \text{Log}(p_t(t)) \quad (22)$$

$$P_t(t) = \frac{TH^L_{i,j}(t)}{\sum_{k=1}^{n} TH^L_{i,j}(k)} \quad (23)$$

where $TH^L_{i,j}(t)$ is a temporal phase histogram and the corresponding probability distribution function of temporal phase is $p_t(t)$, and n is the number of histogram bins.

In this manner, motion information from the three inductors I, Cs, and Ct may be obtained. The outputs from the three inductors I, Cs, and Ct can be used to characterize the dynamic spatial-temporal attribute of motion. Accordingly, motion attention may be defined as follows:

$$B = I \times Ct \times (1 - I \times Cs) \quad (24)$$

Moreover, by using this equation, the outputs from I, Cs, and Ct inductors may be integrated into a motion saliency map, in which areas with attention-attracting motion may be precisely identified.

For instance, additional image processing procedures may be employed to detect the salient motion regions. These additional image processing procedures may include Histogram Balance, Median Filtering, Binarization, Region Growing, and Region selection. Once motion detection is complete, a motion attention model may be calculated by accumulating the brightness of the detected motion regions in a saliency map as follows:

$$M_{motion} = \frac{\sum_{r \in \Lambda} \sum_{q \in \Omega_r} B_q}{N_{MB}} \quad (25)$$

wherein $B_q$ is the brightness of a macro block in the saliency map, Λ is the set of attention-attracting areas caused by motion activities, $\Omega_r$ denotes the set of macro blocks in each attention area, and $N_{MB}$ is the number of macro blocks in a MVF that is used for normalization. The motion attention value of each frame in the shot, $M_{motion}$, may be used to form a continuous attention curve as a function of time.

At block 604, the attractiveness analyze 210 may implement the static attention model. The static attention model measures the ability of static region of images to attract view attention. According to various embodiments, the static attention model may be based on a contrast-based saliency map. This is because contrast is an important parameter in assessing vision. Whether an object can be perceived or not depends on the distinctiveness between itself and environment. Consequently, the contrast-based saliency map may be based on a generic contrast definition. For example, given an image with M*N pixels or blocks, the contrast value at a pixel or block is defined as follows:

$$C_{i,j} = \sum_{q \in \Theta} d(P_{i,j}, q) \quad (26)$$

where $p_{i,j}$ (i∈[0,M], j∈[0, N]) and q are representations of appearance at pixel/block (i,j) appearance at pixel/block, such as color. Θ is the neighborhood of $p_{i,j}$ and its size is able to control the sensitivity of the contrast measure. Moreover, d is the difference between $p_{i,j}$ and q, which may be any distance measurement required by different requirements. If all contrasts $C_{i,j}$ are normalized, a saliency map may be formed. Such contrast-based saliency map may represent color, texture, and approximate shape information simultaneously.

Once a saliency map is developed, it may be further processed to show attention-attracting areas as bright areas on a gray-level map. The size, position, and the brightness of the attention-attracting areas in the gray saliency map indicate the degree of viewer attention they attract. Accordingly, a static attention model is computed based on the number of the attention-attracting areas as well as the brightness, area, and position of the attention-attracting areas:

$$M_{static} = \frac{1}{A_{frame}} \sum_{K=1}^{N} \sum_{(i,j) \in R_k} B_{i,j} \cdot w_{pos}^{i,j} \quad (27)$$

where $B_{i,j}$ denotes the brightness of the pixels in the attention-attracting area $R_k$, N denotes the number of the attention-attracting area, $A_{frame}$ is the area of the frame, and $w_{pos}^{i,j}$ is a normalized Gaussian template with the center located at the center of the frame. Since viewers usually pay more attention to the areas near to frame center, this normalized Gaussian template assigns a weight to each pixel or block in this region. The static attention value of each frame in the shot, $M_{static}$, may then be used to form a continuous attention curve as a function of time.

At block 606, the attractiveness analyze 210 may implement the face attention model. The face attention model may be employed to assess the attention-attracting ability of faces in a shot. The appearances of dominant faces in a video usually attract viewer attention. In other words, the position and size of a face in a shot reflects importance of the face. Correspondingly, the position and size of a face also reflects the importance of the frame containing the face. Thus, face attention may be modeled as:

$$M_{face} = \sum_{K=1}^{N} \frac{A_k}{A_{frame}} \times \frac{w_{posi}^j}{8} \quad (28)$$

wherein $A_k$ denotes the size of $K^{th}$ face, $A_{frame}$ denote the area of the frame, $w_{pos}^i$ is the weight of a position as shown in FIG. 6, and $i \in [0,8]$ is the index of the position.

At block 608, the attractiveness analyze 210 may implement the camera attention model. The camera motion model may be configured to transform camera motion variation, including motion type, direction and velocity into an attention curve. For example, camera motion may be classified into the following types: (1) panning and tilting, or camera rotation around the x-axis and y-axis; (2) rolling, resulting from camera rotations around a z-axis; (3) tracking and booming, resulting from camera displacement along the x-axis and the y-axis; (4) dollying, resulting from camera displacement along the z-axis; (5) zooming, resulting from focus adjustment, and (6) stills.

According to various embodiments, the attention values caused by the above described camera motions are quantified to the range of [0~2]. An attention value higher than "1" means emphasis, and an attention value smaller than "1" indicates neglect. An attention value that is equal to "1" indicates that the camera did not intend to attract the viewer's attention.

In some embodiments, camera attention may be modeled based on the following assumptions: (1) zooming and dollying are always used for emphasis. Specifically, the faster the zooming/dollying speed, the more important the focused content; (2) horizontal panning indicates neglect; (3) other camera motions have no obvious intention; and (4) if the camera motion changes too frequently, the motion is considered random or unstable. Accordingly, camera motions other than zooming, dollying, and horizontal panning, as well as rapid camera motion changes, may be assigned a value of "1".

Figure 11:
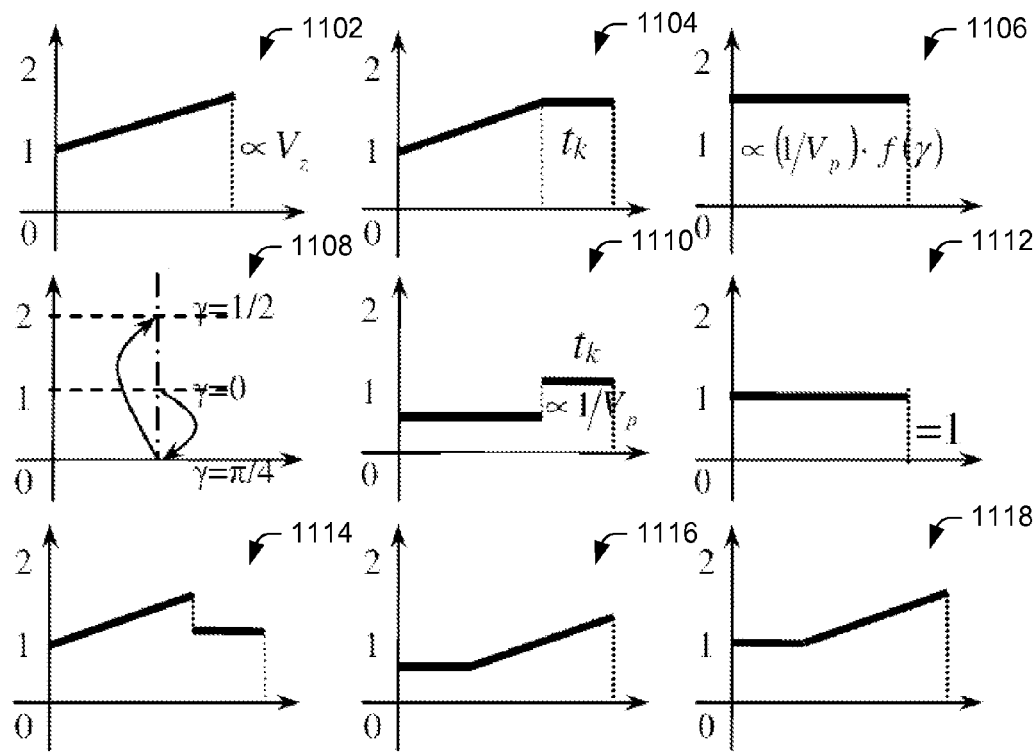
FIG. 11 is a diagram that illustrates exemplary models of camera motion used for visual attention modeling.

FIG. 11 illustrates exemplary models of camera motion. Specifically, graph 1002 shows zooming. As shown in graph 1102, the attention degree is assigned to "1" when zooming is started, and the attention degree of the end part of the zooming is a direct ratio of the speed of zooming $V_z$. As shown in graph 1104, if a camera becomes still after a zooming, the attention degree at the end of the zooming will continue for a certain period of time $t_k$, and then return to "1".

Additionally, the attention degree of panning is determined by two aspects; the speed $V_p$ and the direction $\gamma$. Thus, the attention degree may be modeled as the product of the inverse speed and the quantization function of direction, as shown in graph 1106. Further, as shown in graph 1108, the motion direction $\gamma \in [0{\sim}\pi/2]$ may be mapped to $[0{\sim}2]$ by a subsection function. Specifically, 0 is assigned to the direction $\gamma=\pi/4$, 1 is assigned to $\gamma=0$, and 2 is assigned to the direction $\gamma=\pi/2$. Thus, the first section is monotonously decreasing while the second section is monotonously increasing.

Graph 1110 shows panning followed by still. In such a scenario, the attention degree may continue for a certain period of time $t_k$, after panning has transitioned into zooming. Moreover, the attention degree will be an inverse ratio to the speed of panning $V_p$. Other models of the relationship between camera motion and attention degree are further illustrated in FIG. 11. For example, graph 1112 shows still and other types of camera motion, graph 1114 shows zooming followed by panning, graph 1116 shows panning followed by zooming, and graph 1118 shows still followed by zooming.

Figure 7:
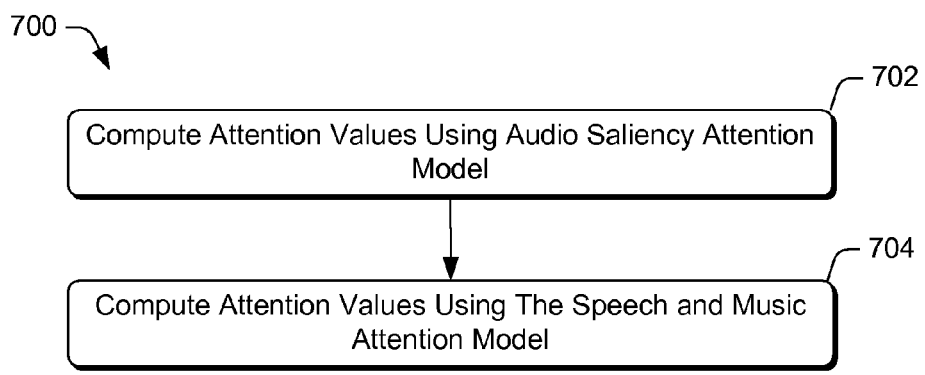
FIG. 7 is a flow diagram showing an illustrative process gauging audio attention using the representative computing environment shown in FIG. 12.

Audio attention is an important parts of the overall attention model frame work 400. For example, speech and music are semantically meaningful for human beings. Loud and sudden noises also tend to grab attention. Accordingly, the definition of audio attention may include three audio attention models. These models include an audio saliency attention model, a speech attention model, and a music attention model. According to various embodiments, these models may be implemented by the attractiveness analyze 210. FIG. 7 further illustrates block 406 of the process 400 by depicting the use of these audio attention models.

FIG. 7 illustrates an exemplary process 700 for using the various attention models. At block 702, the attractiveness analyze 210 may implement the audio saliency attention model. The audio saliency attention model may correlate audience attention with the amount of sound energy, or loudness of the sound. For example, viewers are often attracted to loud or sudden sounds. In various implementations, it is assumed that an individual may pay attention to a sound if: (1) an absolute loud sound, as measured by average energy of the sound, occurs; and (2) the sudden increase or decrease of a sound occurs, as measured by the average energy of the sound. Consequently, the aural saliency model is computed by:

$$M_{as} = \overline{E}_a \overline{E}_p \quad (29)$$

where $\overline{E}_a$ and $\overline{E}_p$ are the two components of audio saliency: normalized average energy and normalized energy peak in an audio segment. They are calculated as follows, respectively:

$$\overline{E}_a = \overline{E}_{avr} / \text{Max} E_{avr} \quad (30)$$

$$\overline{E}_a = \overline{E}_{peak} / \text{Max} E_{peak} \quad (31)$$

where $E_{avr}$ and $E_{peak}$ denote the denote the average energy and energy peak of an audio segment, respectively. $\text{Max}E_{avr}$ and $\text{Max}E_{peak}$ are the maximum average energy and energy peak of an entire audio segment corps. In particular embodiments, a sliding window may be used to compute audio saliency along an audio segment.

At block 704, the attractiveness analyze 210 may implement the speech and music attention models. The speech and music attention models may be used to correlate audience attention with speech and music. In general, audience usually pays more attention shots that are accompanied by speech/music. Accordingly, the saliency of speech/music is measured by the ratio of speech/music to other sounds. In one implementation, an audio segment accompanying a shot may be divided into sub segments. Feature may then be extracted from the sub segments. The features may include mel-frequency cepstral coefficients (MFCCs) and a number of perceptual features, such as short time energy (STE), zero crossing rates (ZCR), sub-band powers distribution, brightness, bandwidth, spectrum flux (SF), and band periodicity (BP). A support vector machine (SVC) may be employed to classify each audio sub segment into speech, music, silence, and other audio components. In this manner, speech ratio and music ratio may be computed as:

$$M_{speech} = N_{speech}^{w} / N_{total}^{w} \quad (32)$$

$$M_{music} = N_{music}^{w} / N_{total}^{w} \quad (33)$$

where $N_{speech}^{w}$, $N_{music}^{w}$, and $N_{total}^{w}$ are the number of speech sub segments, music sub segments, and total sub segments in a sliding window w, respectively. Once block 704 is completed, the process 700 may return to block 508 of the process 500.

At block 508, the attractiveness analyze 210 may fuse the various visual and aural models into a final attention curve. The final attention curve may represent the attractiveness of a shot. According to various embodiments, the fusion of curves from the various attention models may be carried as a linear combination or a nonlinear combination.

In the linear fusion scheme, the curves from the various models may be first normalized. Subsequently, linear fusion may be implemented according to the following:

$$A = w_v \cdot \overline{M}_v + w_a \cdot \overline{M}_a + w_l \cdot \overline{M}_l \quad (34)$$

wherein $w_v$, $w_a$, $w_l \geq 0$ ($w_v + w_a + w_l = 1$) are the weights for linear combination, and $\overline{M}_v$, $\overline{M}_a$, and $\overline{M}_l$ are normalize visual, aural, and linguistic attention models, respectively. $\overline{M}_v$, $\overline{M}_a$, and $\overline{M}_l$ may be computed as:

$$M_v = \left(\sum_{i=1}^{p} w_i \cdot \overline{M}_i\right) \times (\overline{M}_{cm})^{S_{cm}} \quad (35)$$

$$M_a = \left(\sum_{j=1}^{q} w_j \cdot \overline{M}_j\right) \times (\overline{M}_{as})^{S_{as}} \quad (36)$$

$$M_l = \left(\sum_{k=1}^{r} w_k \cdot \overline{M}_k\right) \quad (37)$$

where $w_i$, $w_j$, and $w_k$ are internal linear combination weights in visual, aural, and linguistic attention models, respectively, with the constraints of $w_i \geq 0$, $w_j \geq 0$, $w_k \geq 0$, and $$\sum_{j=1}^{q} w_j = 1, \sum_{k=1}^{r} w_k = 1.$$

Further, $\overline{M}_v$, $\overline{M}_v$, and $\overline{M}_v$ denote the normalized visual, aural and linguistic attention models, respectively. $\overline{M}_{cm}$ is the normalized camera motion model that is used as a magnifier in visual attention model. $S_{cm}$ works as the switch for this magnifier. If $S_{cm} \geq 1$, the magnifier is turned on. Otherwise, $S_{cm} < 1$ means that the magnifier is turned off. The higher the value of $S_{cm}$, the more evident the effects of magnifier are. Similarly, $\overline{M}_{as}$ is the normalized aural saliency model and used as a magnifier for the aural attention models. $S_{as}$ may act as a switch for aural saliency. As magnifiers, $S_{as}$ and $S_{cm}$ are all normalized to [0~2]. In this manner, users may adjust the weights in equations 14-17 according to their preferences or application scenarios.

The nonlinear fusion scheme may be especially suitable for situations where one or more attention components may have relatively high attention values, but other attention components have very low values. For example, a shot with high motion attention but very low aural attention.

On the other hand, the nonlinear fusion scheme is a monotone increasing function. Specifically, if n is the number of features in a shot, the feature vector may be denoted by $\vec{x} = (x_1, x_2, \ldots x_n)$, where $0 \leq x_i \leq 1$, $1 \leq i \leq n$, and the fusion function be denoted by $f(x)$ or $f(x_1, x_2, \ldots x_n)$, the nonlinear fusion scheme should satisfy two criteria (equation 38) and (equation 39) for the case of n=2:

$$f(x_1, x_2) < f(x_1 + \epsilon, x_2 - \epsilon) \quad (38)$$

where $0 < \epsilon \leq x_2 \leq x_1$, and $$f(x_1, x_2) < f(x_1 + \epsilon, x_2) \quad (39)$$

where $0 < \epsilon$.

Accordingly, a multi-dimensional Attention Fusion Function (AFF) may be obtained using:

$$AFF_n^{(\gamma)}(\vec{x}) = E(\vec{x}) + \frac{1}{2(n-1) + n\gamma} \sum_{K=1}^{n} |x_k - E(\vec{x})| \quad (40)$$

where $\gamma > 0$ is a constant, and $E(\vec{x})$ is the mean of feature vector $(\vec{x})$, and wherein the following inequalities (41) and (42) are satisfied:

$$AFF_n^{(\gamma)}(x_1, \ldots, x_i, \ldots, x_n) < AFF_n^{(\gamma)}(x_1, \ldots x_i + \epsilon, \ldots, x_n) \quad (41)$$

where $1 \leq i \leq n$, $\epsilon \geq n$, and $$AFF_n^{(\gamma)}(x_1, \ldots, x_i, \ldots, x_j, \ldots, x_n) \leq AFF_n^{(\gamma)}(x_1, \ldots, x_i + \epsilon, \ldots, x_j - \epsilon, \ldots, x_n) \quad (42)$$

where $1 \leq i < j \leq n$, $x_i \geq x_j \geq e > 0$.

At block 510, once an attention curve have been obtained using one of the linear and nonlinear fusion schemes, the attractiveness analyze 210 may extract the key frames and video segments from around the crests of the curve. According to the definition of the user attention model, the crests on the attention curve generally indicate the corresponding key frame or segment that is most likely to attract viewer attention. Moreover, a derivative curve may be generated based on attention to determine the precise position of the crests. The zero-crossing points from positive to negative on the derivative curve are the location of wave crests. Based on the wave crests, a multi-scale static abstraction may be generated to rank the key frames according to the attention value of each frame.

In some implementations, shots in a video source may be further ranked according to the key frames. For example, key frames between two shot boundaries may be used as representative frames of a shot. In such an example, the combined values of the key frames may be used to rank the shot. Additionally, in cases where there is no crest in a shot, the middle frame is chosen as the key frame, and the important value of this shot is assigned to zero.

In other instances, each shot in a video source may include only one key frame. In such instances, the ranking of each shot may be based on the attention value of the key frame. Moreover, if the total number of key frames present, as indicated by the crests, is more than the number of shots in a video, shots with lower importance values will be ignored.

Once the attention value for each shot in the video source has been obtained, the process 500 may return to block 406.

At block 406, the attractiveness analyze 210 may ascertain the attractiveness $A(p_i)$, by computing the linear combination of attractiveness degrees from two adjacent shots besides a shot boundary $p_i$ as follows:

$$A(p_i)=\lambda \times A(s_i)+(1-\lambda)\times A(s_{i+1}) \qquad (43)$$

where $\lambda$ is between 0 and 1.

At block 408, the insertion point generator 212 may determine the video advertisement insertion points based on the discontinuity and attractiveness of the shot boundary $p_i$ (i=2, ... N). In embodiments where the shot boundaries include both visual shot boundaries and the audio shot boundaries, the insertion point generator 212 may first linearly combine the discontinuities of the visual and audio shot boundaries. In other embodiments, the insertion point generator 212 may directly detect the video advertisement insertion points. The detection of video advertisement insertion points can be formalized as finding peaks on a curve that is the linear combination of discontinuity and attractiveness, i.e., $\alpha A+\beta D$, where $-1<\alpha$ and $\beta<1$. Specifically, different advertising strategies may lead to the selection of different $\alpha$ and $\beta$. For example, $\alpha$ may be set to greater than $\beta$, or $\alpha>\beta$, to provider more benefits to advertisers than viewers. On the other hand, a may be set to less than $\beta$, or $\alpha>\beta$, to provide more benefits to viewers than advertisers.

In alternative embodiments, the discontinuity/attractiveness evaluator 214 of the insertion point generator 214 may be employed to set video advertisement insertion points for the investigation of viewer tolerance to the inserted video advertisements, as well as the effectiveness of the video advertisements from the point of advertisers. For example, a set of different parameters (i.e., $\alpha$ and $\beta$) may be selected for generating a combined curve. Video advertisements are then inserted into a video source based on the combined curves. Viewers may then view the video source and provide feedbacks as to their reaction to the advertisement integrated source video (e.g., enjoyable, okay, annoyed, etc.). Moreover, advertisers may be asked to assess the effectiveness of the inserted video advertisements. For example, if the selected insertion points for the video advertisements are effective, the advertisers may observe an increase in website traffic or telephone calls originating from the inserted video advertisements. At block 410, the advertisement embedder 216 may insert at least one video advertisement at each of the detected insertion points.

The determination of optimal video advertisement insertion points based on the concept of "attractiveness" and "intrusiveness" may enable advertisers to maximize the impact of their video advertisements. Specially, optimal video advertisement insertion points may focus the attention of the viewers on the advertisements while keeping negative reactions from most viewers, such as irritation or annoyance, to a minimum. In this manner, content providers, advertisers, and the general public may all benefit. For example, providers of video sources, or content providers, may upload creative content. Meanwhile, advertisers may reach an audience by seamlessly integrating video advertisements into the uploaded content source. In turn, the content providers may then receive compensation for their creative efforts by receiving a share of the advertising revenue while distributing their content to viewers at no cost.

Exemplary System Architecture

Figure 12:
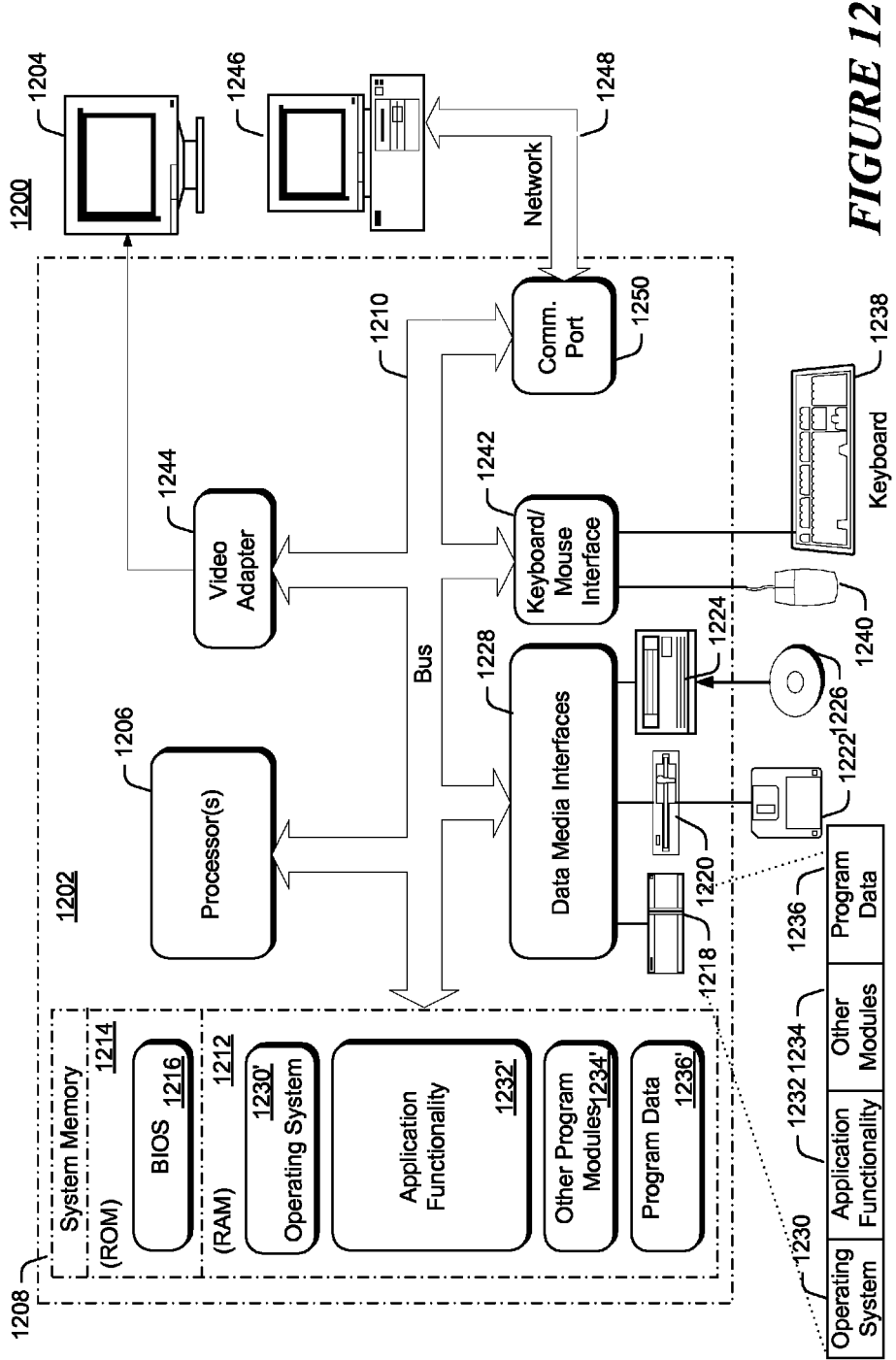
FIG. 12 is a simplified block diagram that illustrates a representative computing environment. The representative environment may be a part of a computing device. Moreover, the representative computing environment may be used to implement the advertisement insertion point determination techniques and mechanisms described herein.

FIG. 12 illustrates a representative computing environment 1200 that may be used to implement the insertion point determination techniques and mechanisms described herein. However, it will readily appreciate that the various embodiments of the transformation techniques may be implemented in different computing environments. The computing environment 1200 shown in FIG. 12 is only one example of a computing environment and is not intended to suggest any limitation as to the scope of use or functionality of the computer and network architectures. Neither should the computing environment 1200 be interpreted as having any dependency or requirement relating to any one or combination of components illustrated in the example computing environment.

As depicted in FIG. 12, the exemplary computing environment 1200 may include a computing device 1202 having one or more processors 1206. A system memory 1208 is coupled to the processor(s) 1206 by one or more buses 1210. The one or more buses 1210 may be implemented using any kind of bus structure or combination of bus structures, including a memory bus or memory controller, a peripheral bus, an accelerated graphics port, and a processor or local bus using any of a variety of bus architectures. It is appreciated that the one or more buses 1210 provide for the transmission of computer-readable instructions, data structures, program modules, and other data encoded in one or more modulated carrier waves. Accordingly, the one or more buses 1210 may also be characterized as computer-readable mediums.

The system memory 1208 may include both volatile and non-volatile memory, such as random access memory (RAM) 1212, and read only memory (ROM) 1214. The environment 1200 also includes one or more mass storage devices, which may also be characterized as mass storage type input/output devices, may include a variety of types of volatile and non-volatile media, each of which can be removable or non-removable. For example, the mass storage devices may include a hard disk drive 1218 for reading from and writing to a non-removable, non-volatile magnetic media, a magnetic disk drive 1220 for reading from and writing to a removable, non-volatile magnetic disk 1222 (e.g., a "floppy disk"), and an optical disk drive 1224 for reading from and/or writing to a removable, non-volatile optical disk 1226 such as a compact disk (CD), digital versatile disk (DVD), or other optical media. Although not shown, the one or more mass storage devices may also include other types of computer-readable medium, such as magnetic cassettes or other magnetic storage devices, flash memory cards, electrically erasable programmable read-only memory (EEPROM), or the like. The hard disk drive 1218, magnetic disk drive 1220, and optical disk drive 1224 may each be connected to the system bus 1210 by one or more data media interfaces 1228. Alternatively, the hard disk drive 1218, magnetic disk drive 1220, and optical disk drive 1224 may be coupled to the system bus 1210 by a SCSI interface (not shown), or other coupling mechanism.

In addition to the mass storage type input/output devices described above, the environment 1200 includes various input/output devices such as a display device 1204, a keyboard 1238, a pointing device 1240 (e.g., a "mouse") and one or more communication ports 1250. In further embodiments, the input/output devices may also include speakers, microphone, printer, joystick, game pad, satellite dish, scanner, card reading devices, digital or video camera, or the like. The input/output devices may be coupled to the system bus 1210 through any kind of input/output interface 1242 and bus structures, such as a parallel port, serial port, game port, universal serial bus (USB) port, video adapter 1244 or the like.

The computing environment 1200 may further include one or more additional computing devices 1246 communicatively coupled by one or more networks 1248. Accordingly, the computing device 1202 may operate in a networked environment using logical connections to one or more remote computing devices 1246. The remote computing device 1246 can comprise any kind of computer equipment, including personal computers, server computers, hand-held or laptop devices, multiprocessor systems, microprocessor-base systems, set top boxes, game consoles, programmable consumer electronics, network PCs, minicomputers, and mainframe computers. The remote computing devices 1246 may include all of the features discussed above with respect to computing device 1202, or some subset thereof. The networked environment may further be utilized to implement a distributed computing environment. In a distributed computing environment, computing resources can be physically dispersed throughout the environment.

Any type of network 1248 can be used to couple the computing device 1202 with one or more remote computing devices 1246, such as a wide-area network (WAN), a local area network (LAN), and/or the like. The computing device 1202 may be coupled to the network 1248 via a communication port 1250, such as a network interface card. The communication port 1250 may utilize broadband connectivity, modem connectivity, DSL connectivity, or other connection strategy. Although not illustrated, the computing environment 1200 may also provide wireless communication functionality for connecting computing device 1202 with remote computing devices 1246 (e.g., via modulated radio signals, modulated infrared signals, etc.). It is appreciated that the one or more networks 1248 provide for the transmission of computer-readable instructions, data structures, program modules, and other data encoded in one or more modulated carrier waves.

Generally, one or more of the above-identified computer-readable mediums provide storage of computer-readable instructions, data structures, program modules, and other data for use by the computing device 1202. For instance, one or more of the computer-readable mediums may store the operating system 1230, one or more application functionalities 1232 (including functionality for implementing aspects of the software transformation methods), other program modules 1234, and program data 1236. More specifically, the ROM 1214 typically includes a basic input/output system (BIOS) 1216. BIOS 1216 contains the basic routines that help to transfer information between elements within computing device 1202, such as during start-up. The RAM 1212 typically contains the operating system 1230', one or more applications functionalities 1232', other program modules 1234' and program data 1236', in a form that can be quickly accessed by the processor 1206. The content in the RAM 1212 is typically transferred to and from one or more of the mass storage devices (e.g., hard disk drive 1218), for non-volatile storage thereof.

It is appreciated that the illustrated operating environment 1200 is only one example of a suitable operating environment and is not intended to suggest any limitation as to the scope of use or functionality of the invention. Other well-known computing systems, environments and/or configurations that may be suitable for use with the invention include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

CONCLUSION

In closing, although the various embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method, comprising:
    parsing, at a computing device, a first video into a plurality of shots that includes one or more shot boundaries; and
    determining, at the computing device, one or more insertion points for inserting a second video into the first video based on a discontinuity and an attractiveness of each of the one or more shot boundaries,
        the discontinuity of a shot boundary being a measure of dissimilarity between a pair of shots that are adjacent to the shot boundary, and
        the attractiveness of the shot boundary being an amount of viewer attention that a corresponding shot boundary attracts that is estimated based on applying one or more attention models to the corresponding shot boundary and combining results from the one or more attention models in accordance with at least one of a linear weighted relationship characterizing the one or more attention models or a non-linear increasing relationship characterizing the one or more attention models.

2. The method of claim 1, wherein the determining the one or more insertion points includes:
    computing a degree of discontinuity for each of the one or more shot boundaries;
    computing a degree of attractiveness for each of the one or more shot boundaries;
    determining one or more insertion points based on the degree of discontinuity and the degree of attractiveness of each shot boundary; and
    inserting the second video at the one or more determined insertion points of the first video to form an integrated video stream.

3. The method of claim 2, further comprising providing the integrated video stream for playback, and assessing effectiveness of the one or more insertion points based on viewer feedback to a played integrated video stream.

4. The method of claim 2, wherein the determining the one or more insertion points includes finding peaks in a linear combination of degrees of discontinuity and degrees of attractiveness of a plurality of shot boundaries.

5. The method of claim 2, wherein each shot boundary comprises a visual shot boundary or an audio shot boundary, and wherein the determining the one or more insertion points further includes linearly combining degrees of discontinuity of one or more visual shot boundaries and one or more audio shot boundaries.

6. The method of claim 2, wherein computing the degree of discontinuity for each of the one or more shot boundaries includes computing at least one of a degree of content discontinuity or a degree of semantic discontinuity for each shot boundary.

7. The method of claim 6, wherein the computing the degree of content discontinuity for each shot boundary includes:
    using a merge method to merge one or more pairs of adjacent shots, wherein the each pair of adjacent shots includes a shot boundary;
    assigning a merging order to each shot boundary, the merging order being assigned based on a chronological order in which a corresponding pair of adjacent shots are merged; and
    calculating a content discontinuity value for each shot boundary based on the corresponding merging order.

8. The method of claim 6, wherein the computing the degree of the semantic discontinuity for each of the one or more shot boundaries includes:
    using one or more first concept detectors to determine a first confidence score between a first shot and at least one corresponding first attribute;
    using one or more second concept detectors to determine a second confidence score between a second shot and at least one corresponding second attribute;

composing at least the first confidence score into a first vector, composing at least the second confidence score into a second vector; and calculating a semantic discontinuity value for a shot boundary between the first and second shots based on a difference between the first vector and the second vector.

9. The method of claim 8, wherein the using the one or more first concept detectors and the one or more second concept detectors includes using concept detectors that are based on support vector machines (SVMs).

10. The method of claim 2, wherein the computing the degree of attractiveness includes computing the degree of attractiveness for each of the plurality of shots using at least one of a motion attention model, a static attention model, a semantic attention model, or a guided attention model.

11. The method of claim 10, wherein the computing the degree of attractiveness further includes computing the degree of attractiveness for each of the plurality of shots using at least one of an audio saliency model, a speech attention model, or a music attention model.

12. The method of claim 11, wherein the computing the degree of attractiveness for each of the one or more shot boundaries further includes:

obtaining one or more visual attractiveness values for at least one shot from a corresponding group of visual attention models;

obtaining one or more audio attractiveness values for the at least one shot from the corresponding group of audio attention models; and combining the one or more visual attractiveness values and the one or more audio attractiveness values using one of the linear weighted relationship or the non-linear increasing relationship to obtain the degree of attractiveness for the at least one shot.

13. The method of claim 12, wherein the computing the degree of attractiveness for each of the one or more shot boundaries further includes:

acquiring a first degree of attractiveness for a first shot;

acquiring a second degree of attractiveness for a second shot that is adjacent the first shot;

computing a degree of overall attractiveness, A(pi), by computing a linear combination of attractiveness degrees from the first and second shots according to:

$$A(p_i) = \lambda \times A(s_i) + (1-\lambda) \times A(s_{i+1})$$

wherein $A(s_i)$ represents the degree of attractiveness for the first shot, and $A(s_{i+1})$ represents the degree of attractiveness for the second shot, and $\lambda$ is a number between 0 and 1.

14. The method of claim 2, wherein the determining the one or more insertion points includes:

constructing a linear combination curve of one or more degrees of overall discontinuity and one or more degrees of attractiveness; and determining the one or more insertion points based on one or more peaks on the linear combination curve.

15. The method of claim 1, wherein the parsing the first video includes parsing the first video into the plurality of shots based on one of visual details of the first video or an audio stream of the first video.

16. The method of claim 15, wherein the parsing the first video into the plurality of shots based on the visual details of the first video includes using one of a pair-wise comparison method, a likelihood ratio method, an intensity level histogram method, or a twin-comparison method, and wherein the parsing the first video into the plurality of shots based on the audio stream of the first video includes using a plurality of kernel support vector machines.

17. A memory having computer-executable instructions that are executable to perform acts comprising:

parsing a first video into a plurality of shots, the plurality of shots includes one or more shot boundaries;

computing a degree of overall discontinuity for each of the one or more shot boundaries, each degree of discontinuity being a measure of dissimilarity between a pair of shots that are adjacent to a corresponding shot boundary;

computing a degree of attractiveness for each of the one or more shot boundaries, each degree of attractiveness being an amount of viewer attention that a corresponding shot boundary attracts that is estimated based on applying one or more attention models to the corresponding shot boundary and combining results from the one or more attention models in accordance with at least one of a linear weighted relationship characterizing the one or more attention models or a non-linear increasing relationship characterizing the one or more attention models;

determining one or more insertion points based on the degree of overall discontinuity and the degree of attractiveness of each shot boundary, the one or more insertion points being for inserting a second video into the first video; and inserting the second video at the one or more determined insertion points to form an integrated video stream.

18. The memory of claim 17, further comprising providing the integrated video stream for playback, and assessing effectiveness of the one or more insertion points based on viewer feedback to a played integrated video stream.

19. The memory of claim 17, wherein the parsing the first video includes parsing the first video into the plurality of shots using one of a pair-wise comparison method, a likelihood ratio method, an intensity level histogram method, or a twin-comparison method.

20. The memory of claim 17, wherein the computing the degree of discontinuity for each shot boundary includes:

computing a degree of content discontinuity for a shot boundary;

computing a degree of semantic discontinuity for the shot boundary; and computing a degree of overall discontinuity for the shot boundary based on an average of the degree of content discontinuity and the degree of semantic discontinuity.

21. The memory of claim 17, wherein computing the degree of discontinuity for each shot boundary includes:

computing a degree of content discontinuity for a shot boundary;

computing a degree of semantic discontinuity for the shot boundary; and computing the degree of overall discontinuity, D(pi), by combining the degree of content discontinuity and the degree of semantic discontinuity for the shot boundary according to:

$$D(p_i) = \lambda D_c(p_i) + (1-\lambda) D_s(p_i)$$

wherein $D_c(p_i)$ represents the degree of content discontinuity, $D_s(p_i)$ represents the degree of semantic discontinuity, and $\lambda$ is a number between 0 and 1.

22. The memory of claim 17, wherein the determining the one or more insertion points includes:

constructing a linear combination curve of one or more degrees of overall discontinuity and one or more degrees of attractiveness; and determining the one or more insertion points based on one or more peaks on the linear combination curve.

23. A system, the system comprising:
one or more processors; and
memory allocated for storing a plurality of computer-executable instructions which are executable by the one or more processors, the computer-executable instructions comprising:
  instructions for parsing a first video into a plurality of shots, the plurality of shots includes one or more shot boundaries;
  instructions for computing a degree of discontinuity for each of the one or more shot boundaries, each degree of discontinuity being a measure of dissimilarity between a pair of shots that are adjacent to a corresponding shot boundary that is computed based on an average of a computed degree of content discontinuity and a computed degree of semantic discontinuity for a corresponding shot boundary, the degree of semantic discontinuity being computed based on at least one attribute of the corresponding shot boundary that is detected by one or more concept detectors;
  instructions for computing a degree of attractiveness for each of the one or more shot boundaries, each degree of attractiveness being an amount of viewer attention that a corresponding shot boundary attracts that is estimated based on applying one or more attention models to the corresponding shot boundary and combining results from the one or more attention models in accordance with at least one of a linear weighted relationship characterizing the one or more attention models or a non-linear increasing relationship characterizing the one or more attention models;
  instructions for determining one or more insertion points based on the degree of discontinuity and the degree of attractiveness of each shot boundary, the one or more insertion points being for inserting a second video into the first video; and
  instructions for inserting the second video at the one or more determined insertion points to form an integrated video stream.

24. The system of claim 23, further comprising instructions for providing the integrated video stream for playback, and assessing effectiveness of the one or more insertion points based on viewer feedback to a played integrated video stream.

25. A memory having computer-executable instructions that are executable to perform acts comprising:
  parsing a first video into a plurality of shots, the plurality of shots includes one or more shot boundaries;
  computing a degree of overall discontinuity for each of the one or more shot boundaries, each degree of discontinuity being a measure of dissimilarity between a pair of shots that are adjacent to a corresponding shot boundary;
  computing a degree of attractiveness for each of the one or more shot boundaries, each degree of attractiveness being an amount of viewer attention that a corresponding shot boundary attracts that is estimated based on applying one or more attention models to the corresponding shot boundary;
  determining one or more insertion points based on the degree of overall discontinuity and the degree of attractiveness of each shot boundary, the one or more insertion points being for inserting a second video into the first video, wherein determining the one or more insertion points comprises constructing a linear combination curve of one or more degrees of overall discontinuity and one or more degrees of attractiveness, and determining the one or more insertion points based on one or more peaks on the linear combination curve; and
  inserting the second video at the one or more determined insertion points to form an integrated video stream.

* * * * *